United States Patent
Momchilov

(10) Patent No.: US 11,645,102 B2
(45) Date of Patent: May 9, 2023

(54) CONNECTION LEASING SYSTEM AND RELATED METHODS FOR USE WITH LEGACY VIRTUAL DELIVERY APPLIANCES

(71) Applicant: CITRIX SYSTEMS, INC., Fort Lauderdale, FL (US)

(72) Inventor: Georgy Momchilov, Parkland, FL (US)

(*) Notice: Subject to any disclaimer, the term of this patent is extended or adjusted under 35 U.S.C. 154(b) by 284 days.

(21) Appl. No.: 16/876,632

(22) Filed: May 18, 2020

(65) Prior Publication Data

US 2020/0371829 A1    Nov. 26, 2020

Related U.S. Application Data

(60) Provisional application No. 62/850,076, filed on May 20, 2019.

(51) Int. Cl.
*G06F 9/455* (2018.01)
*G06F 9/50* (2006.01)

(52) U.S. Cl.
CPC ........ *G06F 9/45558* (2013.01); *G06F 9/5011* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,000,277 B2* | 8/2011 | Momona | ............... | H04W 88/16 370/349 |
| 8,250,163 B2* | 8/2012 | Castaldo | ............. | G06F 11/3495 700/83 |
| 8,578,465 B2* | 11/2013 | Xiao | ....................... | H04L 67/14 709/224 |
| 8,990,898 B2* | 3/2015 | Bell | ........................ | H04L 67/14 726/4 |

(Continued)

OTHER PUBLICATIONS

Joe Deller "Design Considerations for XenDesktop 7.6 Connection Leasing White Paper" Oct. 2014-0;, XP055714446, Retrieved from the Internet Jul. 14, 2020 ; URL:https://citrix.sharefile.com/share/view/s7a47783a8164a528.

(Continued)

*Primary Examiner* — Van H Nguyen

(57) ABSTRACT

A computing system may include client devices configured to request connections to virtual sessions using connection leases issued based upon published resource entitlements, and a computing device configured to store and update the published resource entitlements. The system may also include a virtual delivery appliance configured to provide the client devices with access to the virtual sessions based upon connection descriptor files. A connector appliance may be configured to receive connection requests from the client devices including the connection leases, request validation of the connection leases from the computing device, and resolve the connection leases to the virtual delivery appliance and return a session validation to the client devices (Continued)

responsive to validation of the connection leases. The client devices may be configured to generate the connection descriptor files responsive to the session validations, and initiate connections with the virtual delivery appliance using the generated connection descriptor files.

22 Claims, 20 Drawing Sheets

(56) References Cited

U.S. PATENT DOCUMENTS

| | | | | |
|---|---|---|---|---|
| 9,369,874 | B2* | 6/2016 | Otiato | H04L 63/0876 |
| 10,462,216 | B1 | 10/2019 | Vysotsky et al. | |
| 10,595,202 | B2* | 3/2020 | Momchilov | H04L 63/107 |
| 11,025,560 | B2* | 6/2021 | Singleton, IV | H04L 47/781 |
| 2008/0143489 | A1* | 6/2008 | Castaldo | H04L 67/12 |
| | | | | 714/E11.202 |
| 2009/0187654 | A1 | 7/2009 | Raja et al. | |
| 2013/0219468 | A1 | 8/2013 | Bell | |
| 2017/0339564 | A1* | 11/2017 | Momchilov | H04W 4/50 |
| 2019/0075099 | A1 | 3/2019 | Brouchier et al. | |
| 2020/0218559 | A1 | 7/2020 | Singleton, IV et al. | |

OTHER PUBLICATIONS

Anonymous: "Reference Architecture-Based Design for Implementation of Citrix XenDesktop on Cisco Unified Computing System, VMware vSphere and NetApp Storage" (Aug. 2010) XP055714572, Retrieved from the Internet Jul. 14, 2020 URL:http://citeseerx.ist.psu.edu/viewdoc/download? doi=1 0.1.1.232.7279&rep=rep1 &type= pdf.
Aakash Bhandari "Creating Virtual Desktop Infrastructure Using X en Desktop 7.1 and Vsphere 5.1" (Mar. 2016), XP055714576, Retrieved from the Internet Jul. 14, 2020 URL:https://repository.stcloudstate.edu/cgi/viewcontent.cgi? article=1112&context=msia_etds.
U.S. Appl. No. 16/739,342, filed Jan. 10, 2020 Momchilov et al.
U.S. Appl. No. 16/847,780, filed Apr. 14, 2020 Momchilov et al.
U.S. Appl. No. 16/416,452, filed May 20, 2019 Momchilov et al.
U.S. Appl. No. 16/416,481, filed May 20, 2019 Momchilov et al.
U.S. Appl. No. 16/421,846, filed May 24, 2019 Momchilov et al.

* cited by examiner

CONNECTION LEASING SYSTEM AND RELATED METHODS FOR USE WITH LEGACY VIRTUAL DELIVERY APPLIANCES

CROSS-REFERENCE TO RELATED APPLICATIONS

This application claims the benefit of provisional application No. 62/850,076 filed May 20, 2019, which is hereby incorporated herein in its entirety by reference.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A method may include receiving connection requests at a connector appliance from a plurality of client devices to initiate virtual sessions. The connection requests may include connection leases issued based upon published resource entitlements, and the published resource entitlements for the plurality of client devices may be stored and updated by a computing device. The method may further include requesting validation of the connection leases at the connector appliance from the computing device and, responsive to validation of the connection leases by the computing device, at the connector appliance, resolving the connection leases to a virtual delivery appliance. The virtual delivery appliance may be configured to provide the client devices with access to the virtual sessions based upon connection descriptor files. The method may also include returning a session validation from the connector appliance to the client devices for use in preparing the connection descriptor files to access the virtual sessions.

By way of example, the connection descriptor files may be generated at the client devices from the connection leases and the session validations. In an example embodiment, receiving may comprise receiving by the connector appliance connection requests from the client devices by directly connecting the client devices to the connector appliance using the connection leases. In another example, receiving may comprise receiving by the connector appliance connection requests from the client devices by connecting the client devices to the connector appliance using the connection leases via a gateway appliance.

In one example implementation, the connections may be initiated from the client devices to the virtual delivery appliance by directly connecting to the virtual delivery appliance using the connection descriptor files. In accordance with another example, the connections from the client devices to the virtual delivery appliance may be initiated via a gateway appliance using the connection descriptor files.

The method may further include, at the connector appliance, generating connection lease resolution data responsive to requests from the client devices. Moreover, the client devices may be further configured to request connection lease resolution data from at least one of a gateway appliance and other client devices. In an example embodiment, generating may comprise generating telemetry data based upon at least one of the connection leases and the connection lease resolution data, and wherein the client devices receive the telemetry data without generating session requests responsive thereto.

The connection leases may include a network address of the connector appliance to cause at least some of the client devices to indirectly request connections to the virtual sessions through the virtual delivery appliance via the connector appliance. In an example embodiment, the virtual delivery appliance may comprise a plurality of virtual delivery appliances located in different zones, the connector appliance may comprise a plurality of connector appliances located in the different zones and assigned to virtual delivery appliances in their zones, and the method may further include, at the connector appliances, re-directing connection requests to another connector appliance in a different zone without availability of the computing device to authorize connection requests for their own zones. In accordance with another example, the method may further include, at connector appliances within a same zone, electing a leader connector appliance for the zone, and re-directing received connection requests to the leader connector appliance without availability of the computing device to authorize connection requests for the zone. Furthermore, at the leader connector appliance for a zone, the method may also include synchronizing with the computing device a local host cache comprising at least one of published resource entitlements and virtual session information, and without availability of the computing device to authorize connection requests for the zone, validating connection leases, resolving the connection leases to the virtual delivery appliance, and returning session validations to the client devices. The method may also include, at the connector appliance, directing the client devices to proceed to a next option in their connection leases without availability of the computing device.

A related computing system may include a plurality of client devices configured to request connections to virtual sessions using connection leases issued based upon published resource entitlements, and a computing device configured to store and update the published resource entitlements for the plurality of client devices. The computing system may also include a virtual delivery appliance configured to provide the client devices with access to the virtual sessions based upon connection descriptor files. Furthermore, a connector appliance may be configured to receive connection requests from the client devices including the connection leases, request validation of the connection leases from the computing device, and responsive to validation of the connection leases by the computing device, resolve the connection leases to the virtual delivery appliance and return a session validation to the client devices. The client devices may be configured to generate the connection descriptor files responsive to the session validations, and initiate connections with the virtual delivery appliance using the generated connection descriptor files to access the virtual sessions.

DETAILED DESCRIPTION

In a virtual computing architecture, connection leases may be issued to client devices by a brokering service. The connection leases may include static snapshots of resource entitlements the client devices are permitted to access. By way of example, the resources being accessed by the client devices may include virtual applications, virtual desktops, Software-as-a-Service (SaaS) applications, Desktop-as-a-Service (DaaS) sessions, etc. Moreover, the connection leases may also include resource location data allowing for relatively long-term access (e.g., one or more weeks) before the connection lease expires and has to be renewed. This helps promote faster access to the resources by the client devices, as they are not required to re-register with the brokering service each time they request access to a virtual computing session. However, deploying connection lease compatible components in a system including legacy (non-connection lease compatible) components may result in various technical problems.

One such technical problem is how to support a relatively large footprint of existing or legacy virtual delivery appliances while at the same time transitioning to a next generation of virtual delivery appliances which utilize a different connection approach. That is, where legacy virtual delivery appliances are already deployed in a network infrastructure that provide connections to virtual sessions based upon a first protocol, and new virtual delivery appliances are to be deployed that use a second protocol different from the first protocol, there is a technical problem of how to allow for continued use of the legacy appliances within the network infrastructure even though they are not compatible with the first protocol. Additionally, in some implementations virtual delivery appliances may be grouped into zones to service a dedicated region, facility, etc., yet the different zones are not otherwise configured to communicate and coordinate with one another. A technical problem with such arrangements is how to support zone failover when a cloud connection lease infrastructure is offline without communication between different zones of virtual delivery appliances. The systems and methods described herein advantageously provide solutions to these technical problems through the use of connector appliances which may interface with a cloud-based connection lease infrastructure on behalf of legacy virtual delivery appliances that are not connection lease compatible. This advantageously provides compatibility between the cloud-based connection lease infrastructure and the legacy virtual delivery appliances, and also the ability to re-direct session requests between zones during cloud infrastructure outages, as will be discussed further below.

Figure 1:
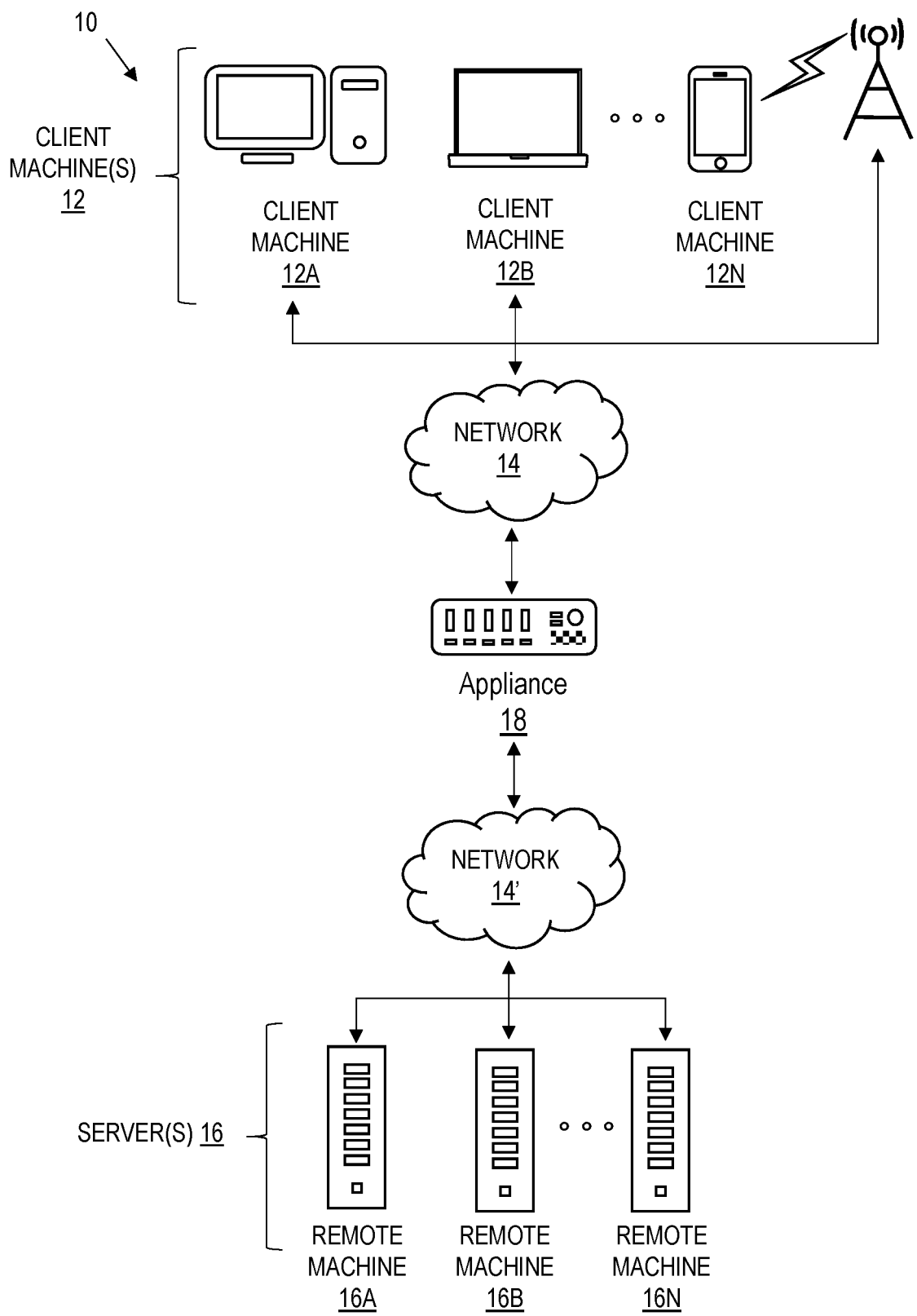
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
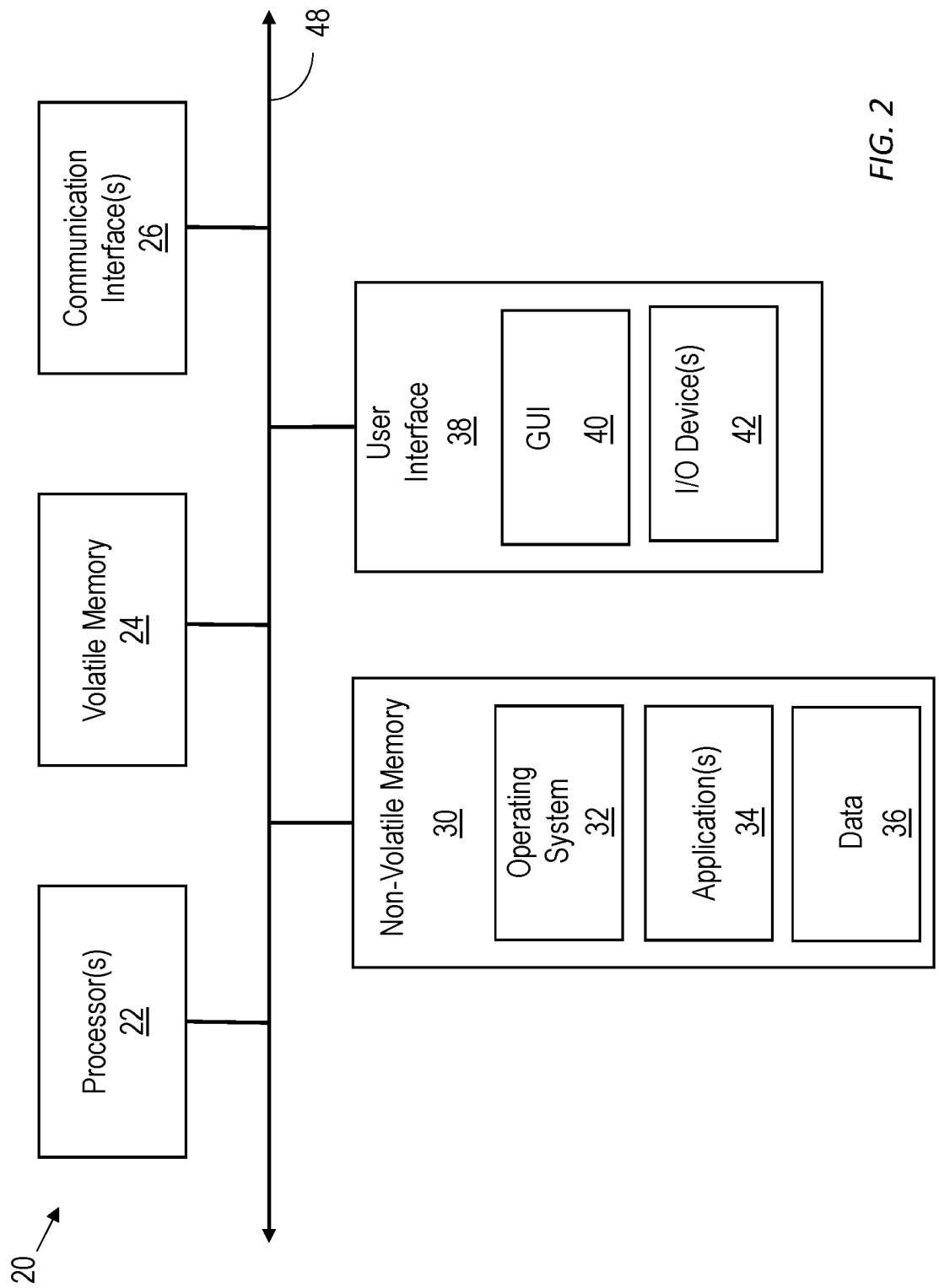
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
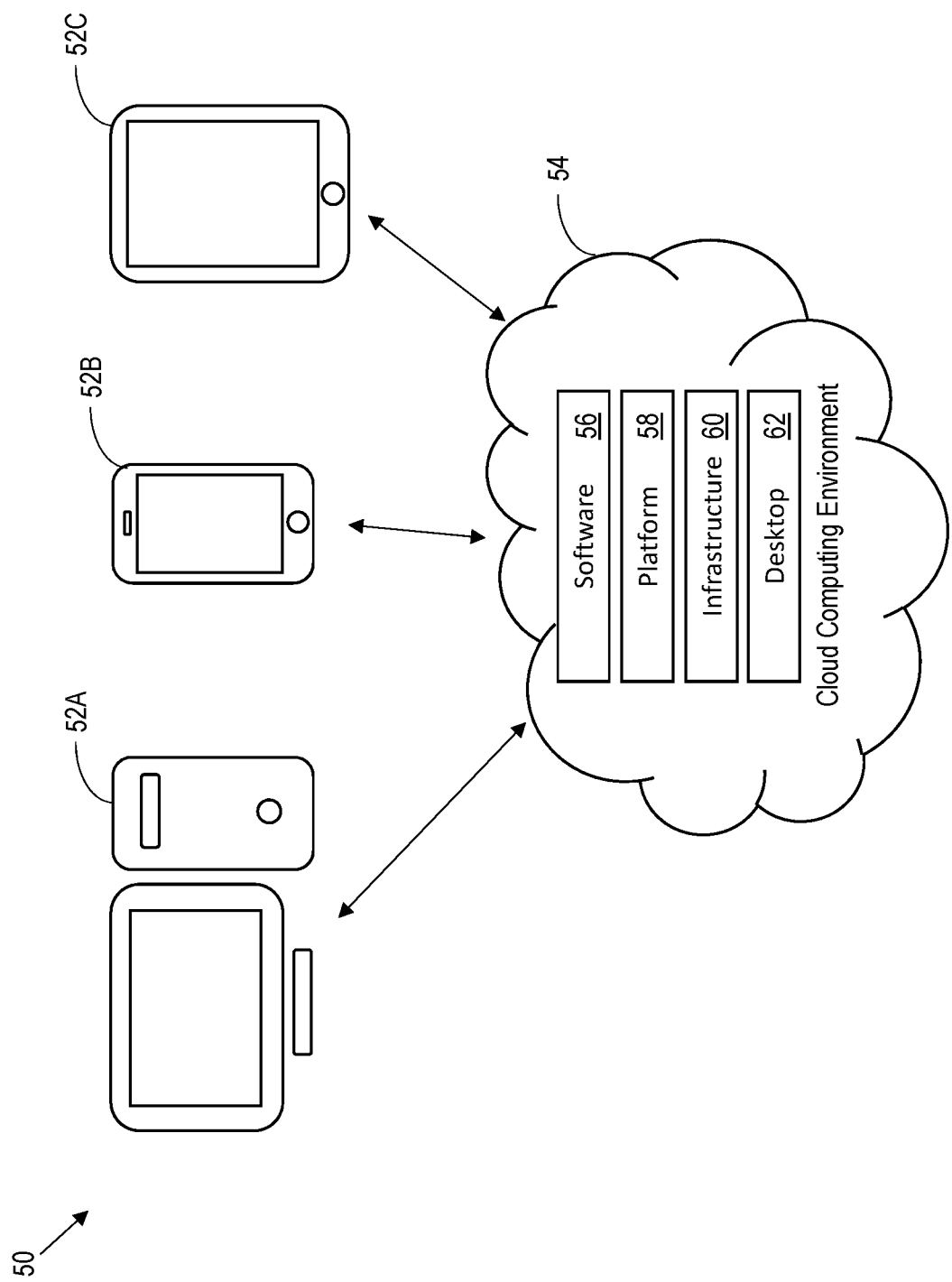
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
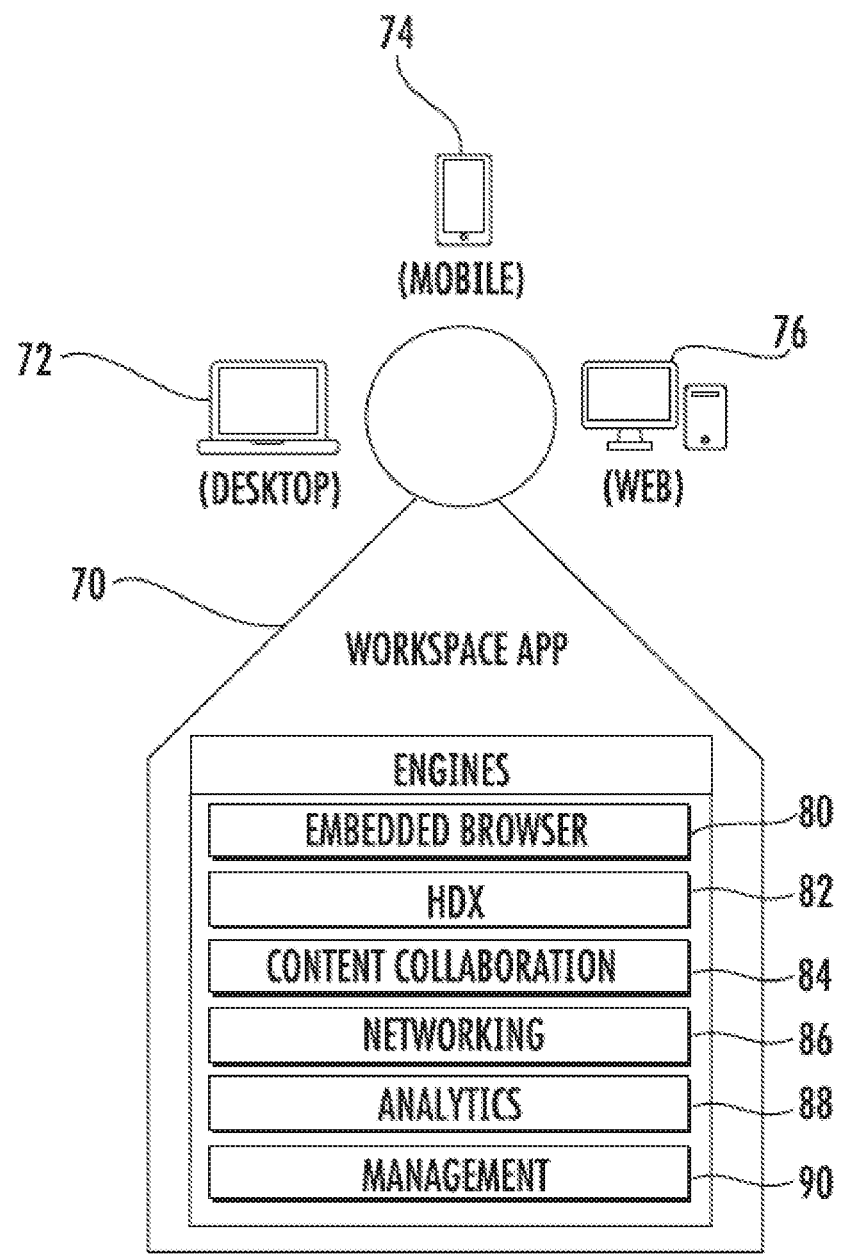
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
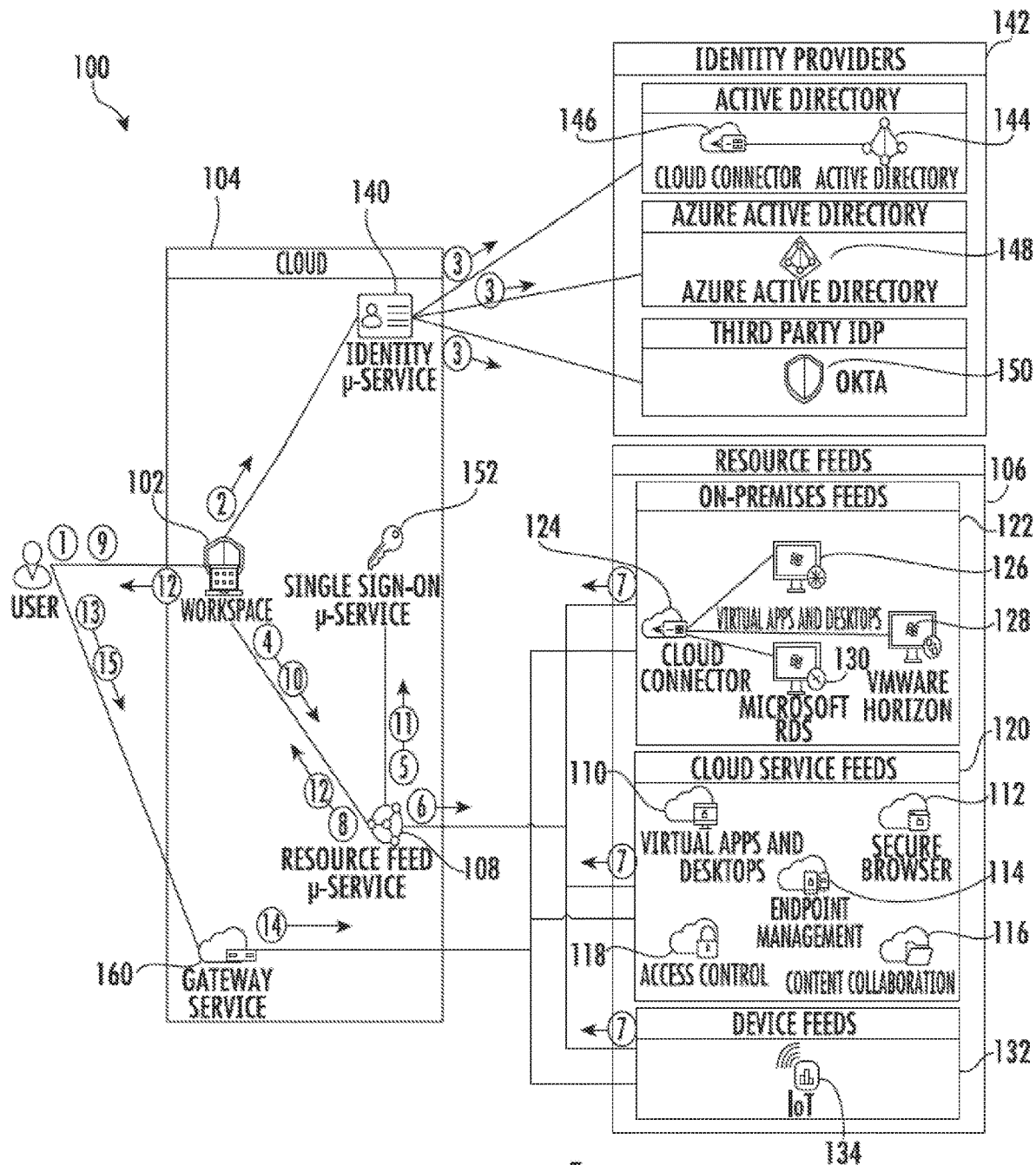
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a username and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third-party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
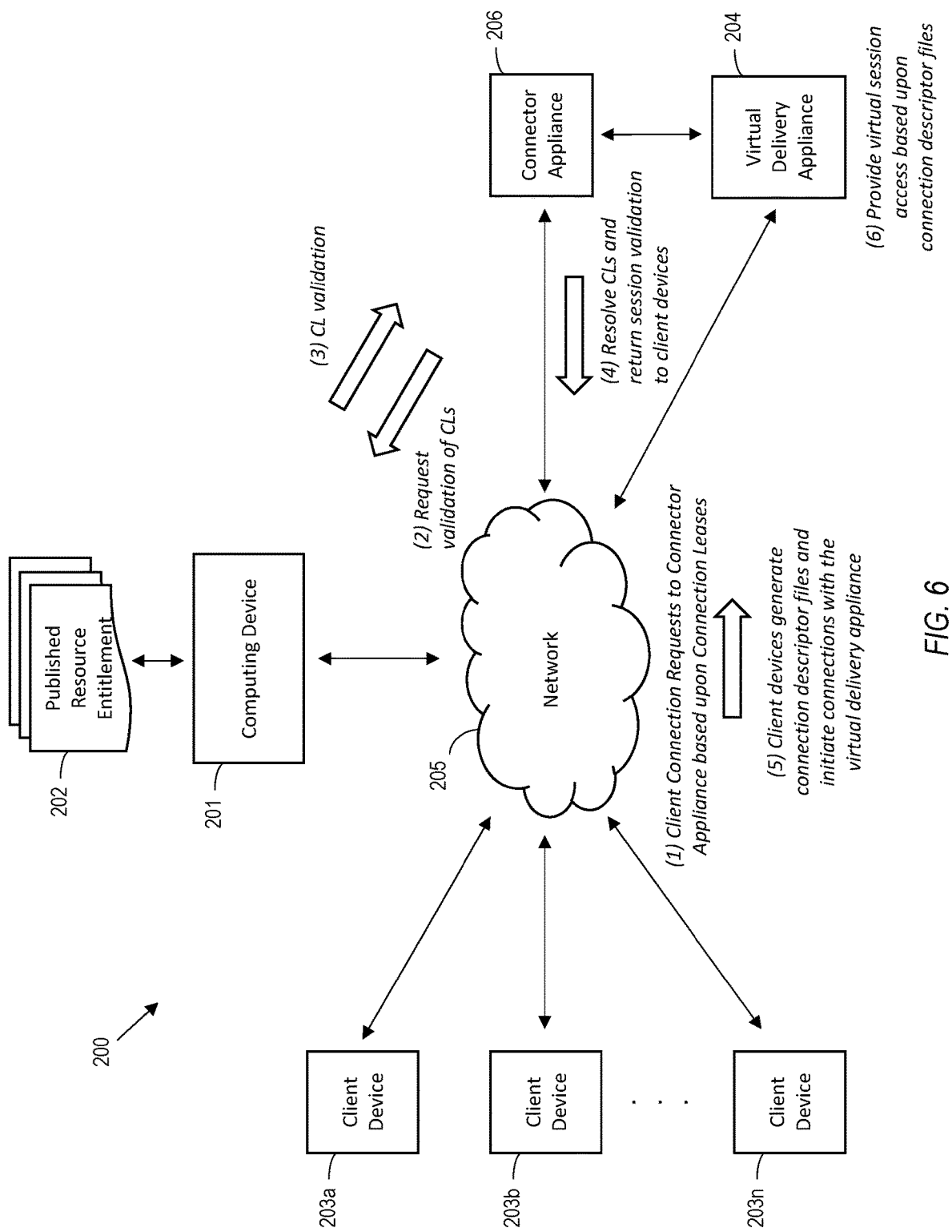
FIG. 6 is a schematic block diagram of a computing system providing virtual session access through non-connection lease enabled virtual delivery appliances in a connection lease configuration.

Turning now to FIG. 6, a virtual computing system 200 is first described which provides for the use of connection leases for accessing virtual computing sessions in a virtual computing environment using legacy components that are not connection lease compatible, meaning they instead use a legacy connection protocol (e.g., a protocol configured using legacy connection descriptor files such as Independent Computing Architecture (ICA) files) that does not recognize or is otherwise not compatible with connection leases, as will be discussed further below. By way of example, the system 200 may be implemented using the above described computing devices, and in some implementations within the workspace infrastructure, as will be discussed further below.

Another example architecture for providing access to virtual computing sessions is Citrix Virtual Apps and Desktops (CVAD) from the present Applicant Citrix Systems, Inc. Citrix Virtual Apps is an application virtualization solution that helps optimize productivity with universal access to virtual apps and server-based desktops from different client devices. CVAD carries all the same functionality as Citrix Virtual Apps, plus the option to implement a scalable Virtual Desktop Infrastructure (VDI). Citrix Virtual Apps/CVAD are available as a cloud service or a traditional software configuration.

Such computer virtualization infrastructures may traditionally utilize an Independent Computing Architecture (ICA) protocol and ICA files for authenticating client devices to access the virtual sessions and computing resources to which the users are entitled. ICA is a protocol designed for transmitting Windows graphical display data as well as user input over a network. ICA files contain short-lived Secure Ticket Authority (STA) and logon tickets. The STA ticket may be used to authorize a connection to a virtual delivery appliance (e.g., Citrix Virtual Delivery Agent (VDA)) via a Gateway (e.g., Citrix Gateway). The logon ticket may single-sign-on (SSOn) the user into the virtual computing session. In the case of CVAD, this is done through a "high-definition" experience (HDX) session, which may be available to users of centralized applications and desktops, on different client devices and over different networks. Citrix HDX is built on top of the ICA remoting protocol.

With any network infrastructure, remote or otherwise, security from external attacks is always a significant concern. Moreover, connection leases are long-lived (e.g., a few hours to weeks based on policies), and since the attack opportunity window is therefore increased, the security requirements are also increased compared to traditional ICA files. Therefore, connection leases are encrypted and signed. Connection leases may also be revoked to cope with events such as stolen devices, compromised user accounts, closed user accounts, etc. Connection lease revocation may be applied when a client/endpoint device or host is online with respect to a Connection Lease Issuing Service (CLIS) or broker. However, the CLIS or broker does not typically have to be online for a client to use a previously issued connection lease, since connection leases are meant to be used in an offline mode.

The system 200 illustratively includes a computing device 201 configured to store and update published resource entitlements 202 for a plurality of client devices 203*a*-203*n*. By way of example, the computing device 201 may be part of a brokering service or connection lease issuing service (CLIS), and the published resource entitlements may relate to the virtual computing resources (e.g., SaaS apps, DaaS sessions, virtual apps/desktops, etc.) that the client devices 203*a*-203*n* are permitted or authorized to access. The client devices 203*a*-203*n* may be desktop or laptop computers, tablet computers, smartphones, etc., as noted above. The client devices 203*a*-203*n* are configured to request connections to virtual sessions using connection leases issued (e.g., by a CLIS) based upon the published resource entitlements.

The system 200 further illustratively includes a virtual delivery appliance 204 that communicates with the client devices 203*a*-203*n* via a network 205 (e.g., the Internet or Web). In the present example, the virtual delivery appliance 204 is a legacy appliance typically associated with an on-premises deployment that is configured to provide the client devices 203*a*-203*n* with access to the virtual sessions based upon connection descriptor files (e.g., ICA files) and STA tickets, as discussed above, rather than the connection leases issued to client devices by a cloud-based CLIS, for example. That is, rather than cloud-based virtual delivery appliances that are configured to interact directly with the computing device 201 as part of a cloud infrastructure and are connection lease compatible, the legacy virtual delivery appliance 204 may not be connection lease compatible nor configured to cooperate with the computing device to validate connection leases, for example, because it is instead configured to establish connections to virtual sessions based upon connection description files (e.g., ICA files) rather than connection leases.

As a result, the system 200 also advantageously includes a connector appliance 206, which may also be deployed on premises with the virtual delivery appliance 204 in some embodiments. The connector appliance 206 may be configured to receive connection requests from the client devices 203a-203n including the connection leases (instead of the legacy virtual delivery appliance 204), and request validation of the connection leases from the computing device 201 (instead of the virtual delivery appliance). In some embodiments, the connector appliance 206 may perform additional validations on the connection leases, such as checking the connection leases against expiration (e.g. checking expiration date) or tempering (e.g. checking signature). Responsive to validation of the connection leases by the computing device 201, the connector appliance 206 may then resolve the connection leases to the virtual delivery appliance 204, and return a session validation to the client devices 203a-203n. In some embodiments, the resolution of the connection leases to the virtual delivery appliance 204 may be performed by the computing device 201 and returned to the connector appliance 206, prior to the connector appliance 206 returning the session validation to the client devices 203a-203n. As such, responsive to the session validations, the client devices 203a-203n may advantageously generate the connection descriptor files (e.g., ICA files) the virtual delivery appliance 204 uses to perform session connections, and initiate the connections with the virtual delivery appliance using the generated connection descriptor files to access the virtual sessions instead of the connection leases.

Figure 7:
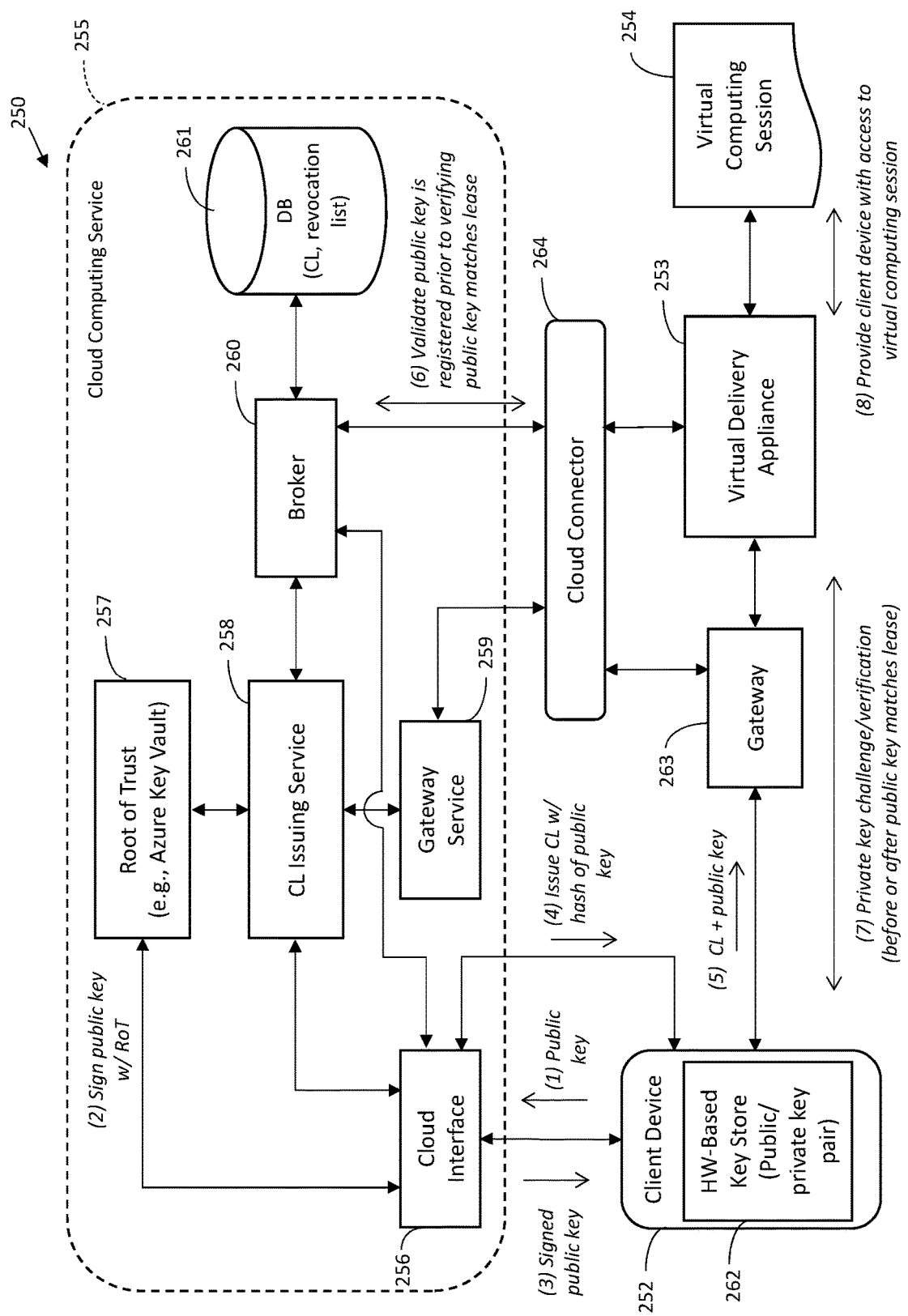
FIG. 7 is a schematic block diagram of a connection lease architecture and independent flow sequences in which the system of FIG. 6 may be implemented in accordance with an example embodiment.

The foregoing will now be further described in the context of an example implementation of a computing system 250 shown in FIG. 7. In the illustrated example, the above-described computing device 201 and lease generation functions are performed within a cloud computing service 255 (e.g., Citrix Cloud) which illustratively includes a cloud interface 256 configured to interface with a client device 252 for enrollment and lease generation to access virtual sessions 254. In an example embodiment, the cloud interface 256 may be implemented with Citrix Workspace, and the client device 252 may be running Citrix Workspace App, although other suitable platforms may be used in different embodiments. The cloud computing service 255 further illustratively includes a Root of Trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. By way of background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262. This process, referred to as wrapping or binding a key, can help protect the key from disclosure, such as from other parts of the client device 252 (e.g., the client device operating system (OS) as described above), and therefore from potential exfiltration to malicious processes running on the client device or from exfiltration to other devices. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 7, the client device 252 provides its public key to the cloud interface 256 (step (1) in FIG. 7), which then has the public key signed by the RoT 257 (step (2) in FIG. 7) and returns the signed public key to the client device (step (3) in FIG. 7). Having the public key signed by the RoT 257 is significant because the gateway 263, the virtual delivery appliance 253, and the broker 260 also trust the RoT and can therefore use its signature to authenticate the client device public key.

The client device 252 may then communicate with the CLIS 258 via the cloud interface 256 to obtain the connection lease (step (4) in FIG. 7). The client device 252 public key may be provided to a host or virtual delivery appliance 253 (e.g., Citrix VDA) either indirectly via the broker 260 or directly by the client device. In the present example, the virtual delivery appliance 253 is enabled for use with connection leases, in contrast to the legacy virtual delivery appliance 204 described above. If the client device 252 public key is indirectly provided to the virtual delivery appliance 253, then the security associated with the client-to-broker communications and virtual delivery appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 7). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand.

Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 7). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 7). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

The illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktops Broker). This may be done in conjunction with the connection lease exchange that occurs between the client device 252 and the virtual delivery appliance 253, and utilizing signed responses from the broker 260 and virtual delivery appliance 253. These play a significant role for the resiliency, security, performance and user experience (UX) with respect to connection leasing. However, because the legacy virtual delivery appliances 204 described above with reference to FIG. 6 are not configured for such connection lease exchanges, these advantages would not otherwise be possible while using such legacy appliances.

Figure 8:
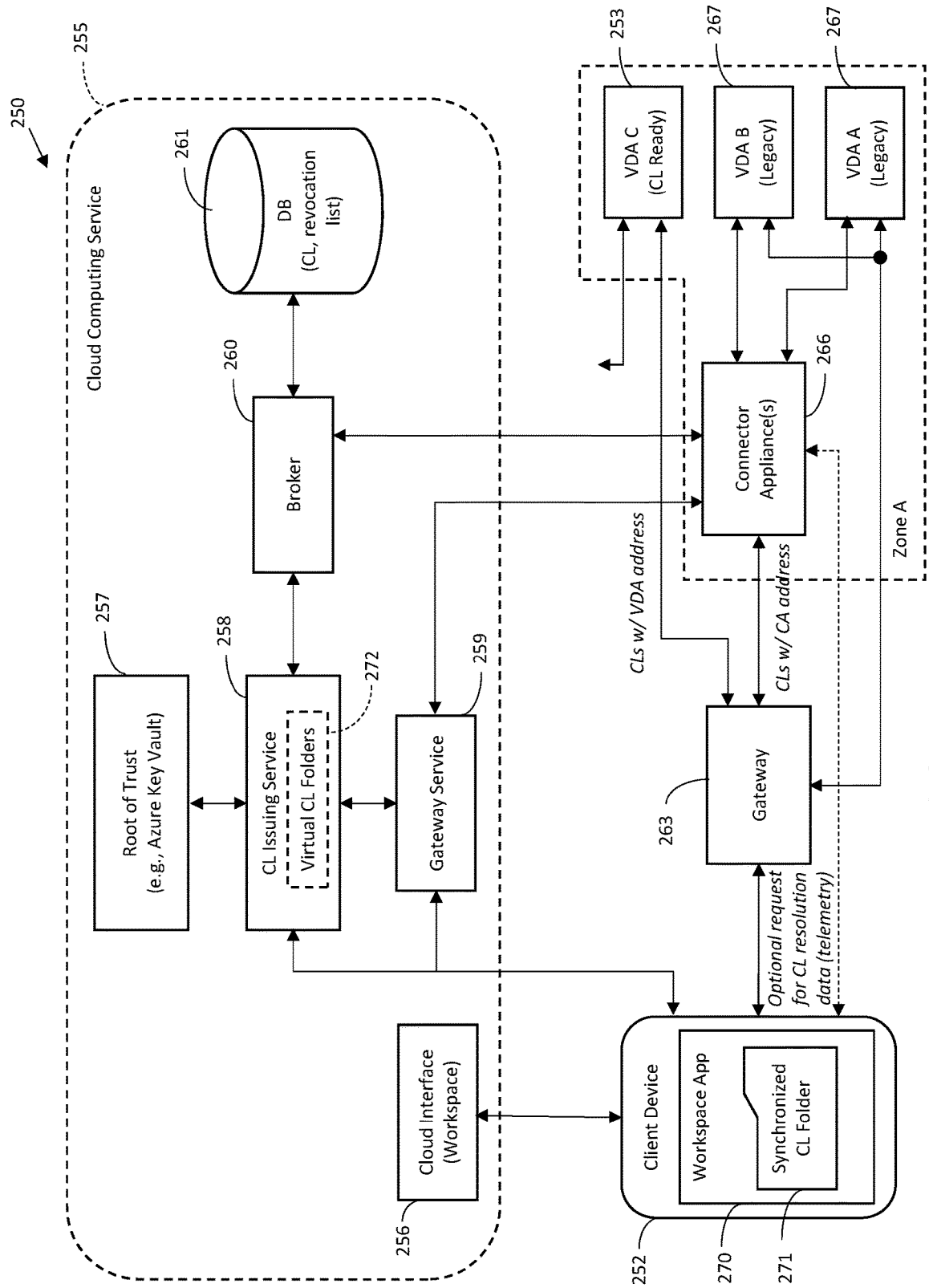
FIG. 8 is a schematic block diagram of the connection lease architecture of FIG. 7 configured to provide operability with both connection lease enabled and non-connection lease enabled (legacy) virtual delivery appliances in accordance with an example embodiment.

Turning now to FIG. 8, another configuration of the system 250 to also accommodate legacy virtual delivery appliances 267 that are not connection lease ready, in addition to cloud-based connection lease ready virtual delivery appliances 253, is now described. In the illustrated example, there are two legacy virtual delivery appliances 267 (here, Citrix VDAs A and B), along with a connection lease enabled virtual delivery appliance 253 (here, Citrix VDA C). The virtual delivery appliances 253, 267 are arranged in a common zone (Zone A) along with one or more connector appliances 266 (which is similar to the connector appliance 206 described above). Moreover, the client devices 252 run a workspace app 270, which maintains a folder 271 for its connection leases that have been synchronized with the connection lease information stored in a virtual connection lease folder 272 at the CLIS 258, as discussed above.

The connector appliance 266 advantageously functions as an emulator for trusted connection lease exchanges with the cloud computing service 250. More particularly, the connector appliance 266 emulates a connection lease capable virtual delivery appliance 253 to the client device 252 and gateway 263. Furthermore, it emulates a connection lease capable anonymous virtual delivery appliance while communicating with the cloud computing service 250 (e.g., the broker 260, Root of Trust 257, etc.), allowing it to receive resolved resource location addresses, credentials, etc. Moreover, the connector appliance 266 further emulates or impersonates the broker 260 while communicating with the legacy virtual delivery appliances 267. In alternative embodiments, the connector appliance 266, instead of emulating or impersonating the broker 260, communicates with the legacy virtual delivery appliances 267 via the broker 260. Furthermore, the connector appliance 266 enables the client device 252 (e.g., workspace app 270) to create the legacy-style connection descriptor file (e.g., ICA file) to securely and reliably connect to the legacy virtual delivery appliances 267, even though these appliances are not connection lease compatible.

Figure 9A:
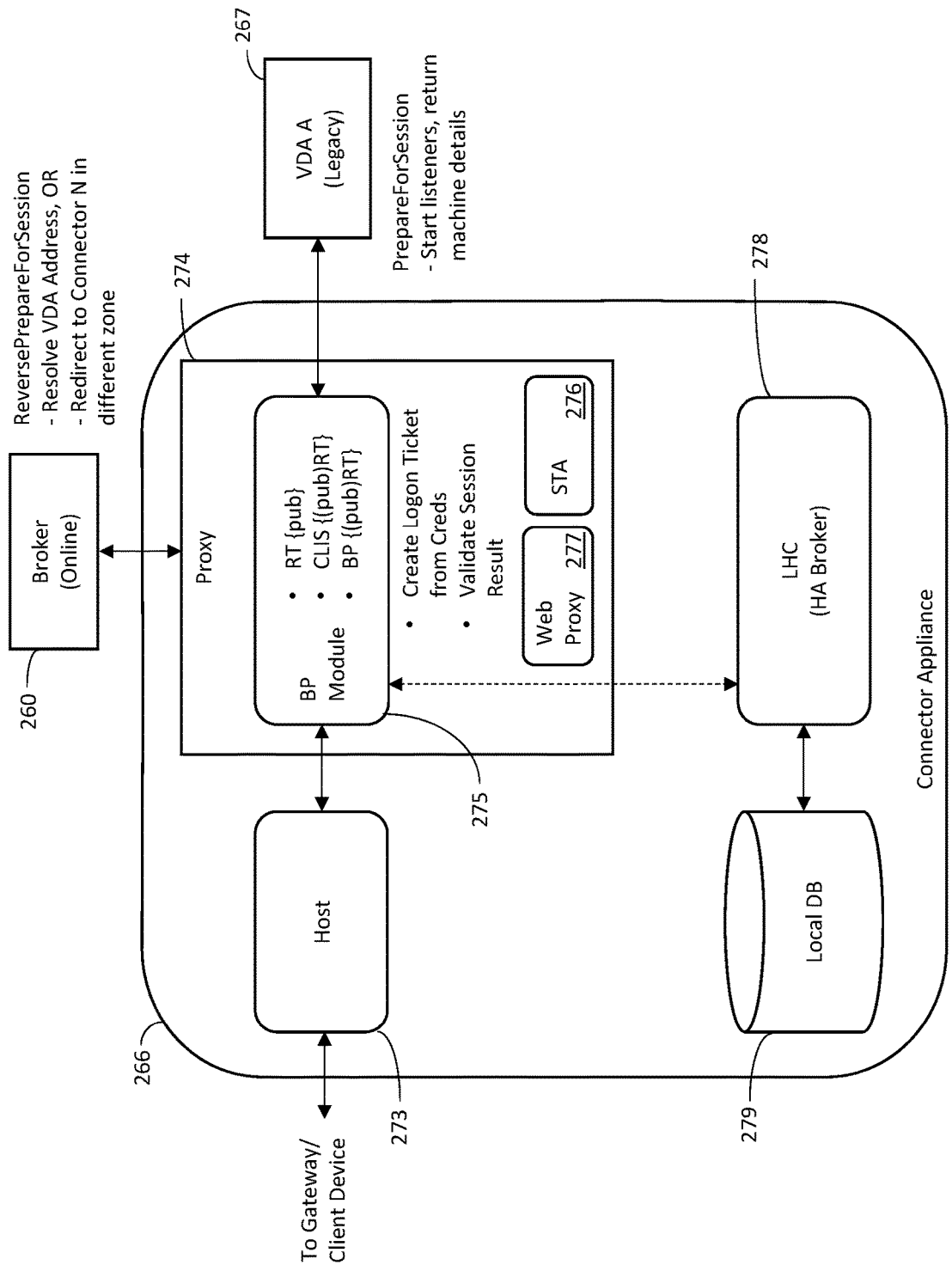
FIGS. 9A and 9B are schematic block diagrams of the connector appliance of the connection lease architecture of FIG. 8 operating in a broker online mode in example embodiments where the broker does not communicate directly with the virtual delivery appliance, and where the broker does have some direct communication with the virtual delivery appliance.

An example implementation of the connector appliance 266 is now described with reference to FIG. 9A. The connector appliance 266 illustratively includes a host module 273 that is configured to communicate with the client devices 252, gateway 263 (e.g., an on-premises gateway appliance) and gateway service 259 (e.g., a cloud gateway service with multiple Points of Presence (POPs)) using the same connection lease compatible trusted protocol that would be used with the virtual delivery appliance 253. A proxy module 274 is configured to communicate with the broker 260 and the legacy virtual delivery appliances 267. The proxy module 274 illustratively includes a brokering protocol (BP) module 275. For example, the BP module 275 may be a Connection Broker Protocol (CBP) module by Citrix, proxying a CBP protocol between the broker 260 and legacy virtual delivery appliances 267 (e.g. the illustrated VDA A (Legacy) 267) and connection lease capable virtual delivery appliance 253. The proxy module 274 may also illustratively and optionally include a Secure Ticket Authority (STA) module 276, and a web proxy module 277. The web proxy module 277 may allow legacy store interfaces (e.g. on-premises StoreFront by Citrix) to communicate with the broker 260. The web proxy module 277 may accept HTTP and HTTPS requests. For example, the web proxy module 277 may be an NfUse proxy module by Citrix, proxying the NfUse store protocol to the broker 260. As will be discussed further below, the connector appliance 266 also advantageously includes a Local Host Cache (LHC) 278 and associated local database 279, which allows for a fallback to an offline cache operation when the cloud computing service 250 in general is unavailable or when the broker 260 in particular is unavailable. For example, the Local Host Cache (LHC) 278 and associated local database 279 may include published resource entitlements, virtual session information, etc. In the example of FIG. 9A, the cloud computing service 250 (and, more particularly, the broker 260) is online and available to perform connection lease validation.

Figure 9B:
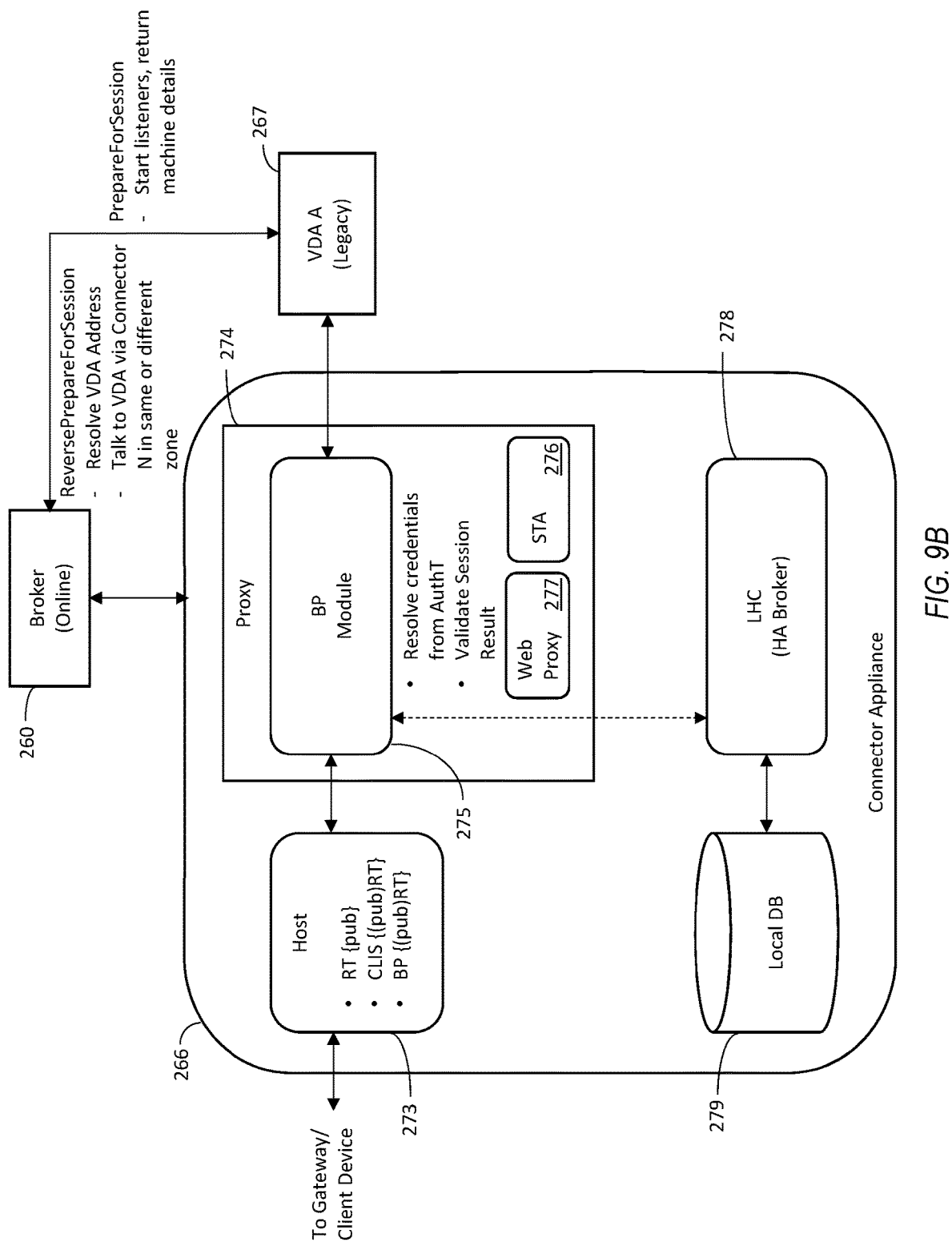

Another example implementation of the connector appliance 266 is now described with reference to FIG. 9B. FIG. 9B is very similar to the implementation described in FIG. 9A. In both FIG. 9A and FIG. 9B, the cloud computing service 250 (and, more particularly, the broker 260) is online and available to perform connection lease validation. However, the key difference according to FIG. 9B, is that the broker 260 talks to the legacy virtual delivery appliances 267 using a legacy (unmodified) call (e.g. "PrepareForSession"), rather than the connector appliance 266 impersonating the broker 260 to talk to the legacy virtual delivery appliances 267 and having to store VDA details (e.g. SID, IP, Version, etc.) for that purpose. This approach simplifies the design and offers additional advantages. For example, the resolution of the connection leases to the legacy virtual delivery appliance 267 may be performed by the computing device 201, and in particular the broker 260, and returned to the connector appliance 266, prior to the connector appliance 266 returning the session validation to the client device 252. This is because when the broker 260 is online, it can resolve any VDA address, including a VDA in a different zone. For example, the broker 260 itself may talk to another connector appliance 266, not the one calling "ReversePrepareForSession" but a different connector appliance 266 in a different zone, in order to initiate "PrepareForSession" at that VDA. Thus, advantageously, the connector appliance 266 does not have to redirect the workspace app 270 or the gateway 263 (or gateway service 259) to another connector appliance 266 in a different zone. The broker 260 does that instead, thus shortening the connection lease resolution process when the resolved VDA happens to be in a different zone.

Figure 10:
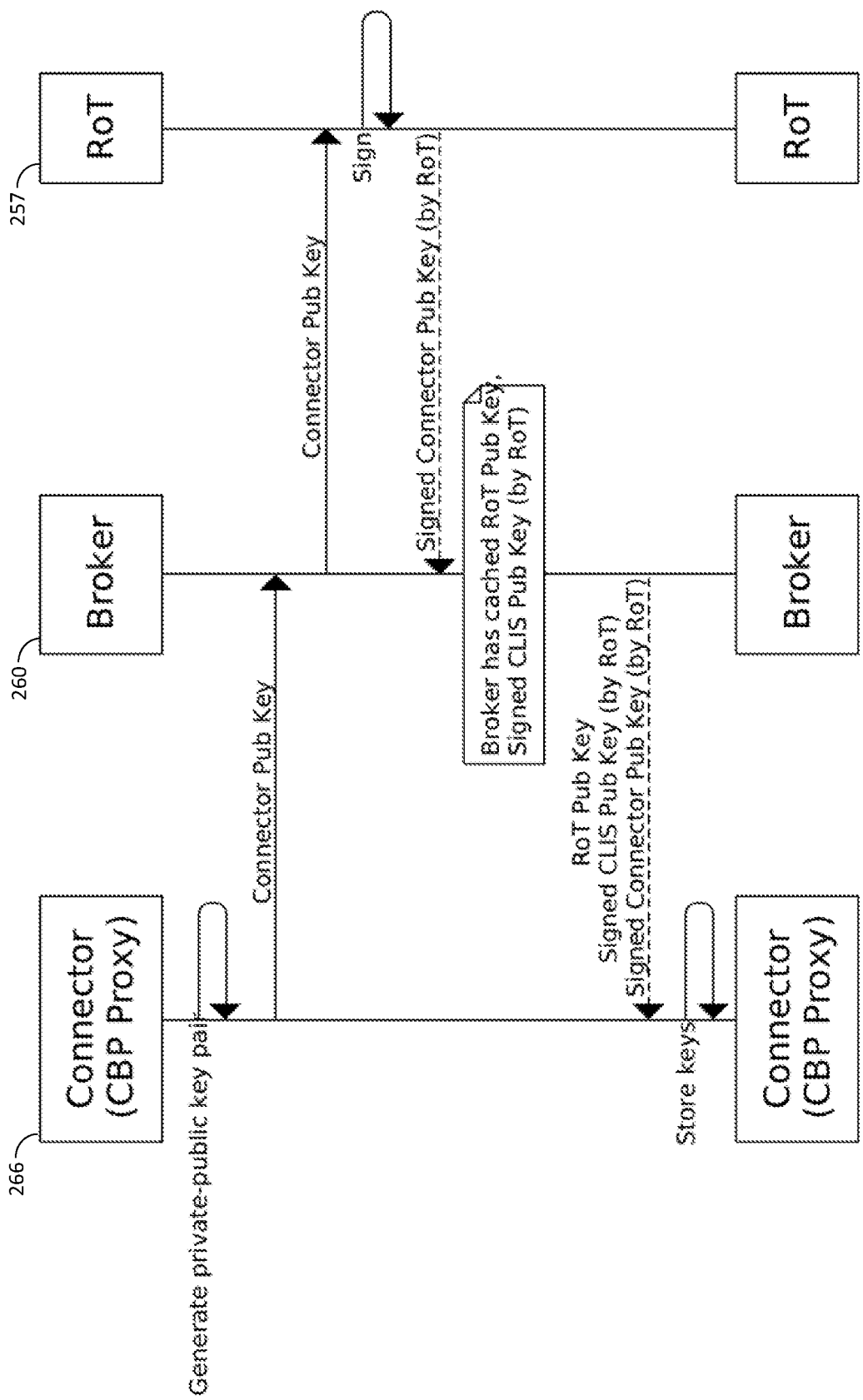
FIG. 10 is a sequence flow diagram illustrating an example approach for connector key bootstrapping in the connection lease architecture of FIG. 8.

Referring additionally to FIG. 10, the connector appliance 266 registers with the cloud computing service 255 by generating its own private/public key pair as described above, and provides the connector public key to the broker 260, which in turn provides it to the RoT 257 for signature. The signed connector public key is returned to the broker 260, which it caches along with a public key of the RoT and a signed (by the RoT) CLIS 258 public key, all of which may then be provided to the connector appliance 266 for storage by the BP module 275, as illustrated in FIG. 9A. In alternative embodiments, the public key storage at the connector appliance 266 may be provided by the host 273, as illustrated in FIG. 9B.

Figure 11:
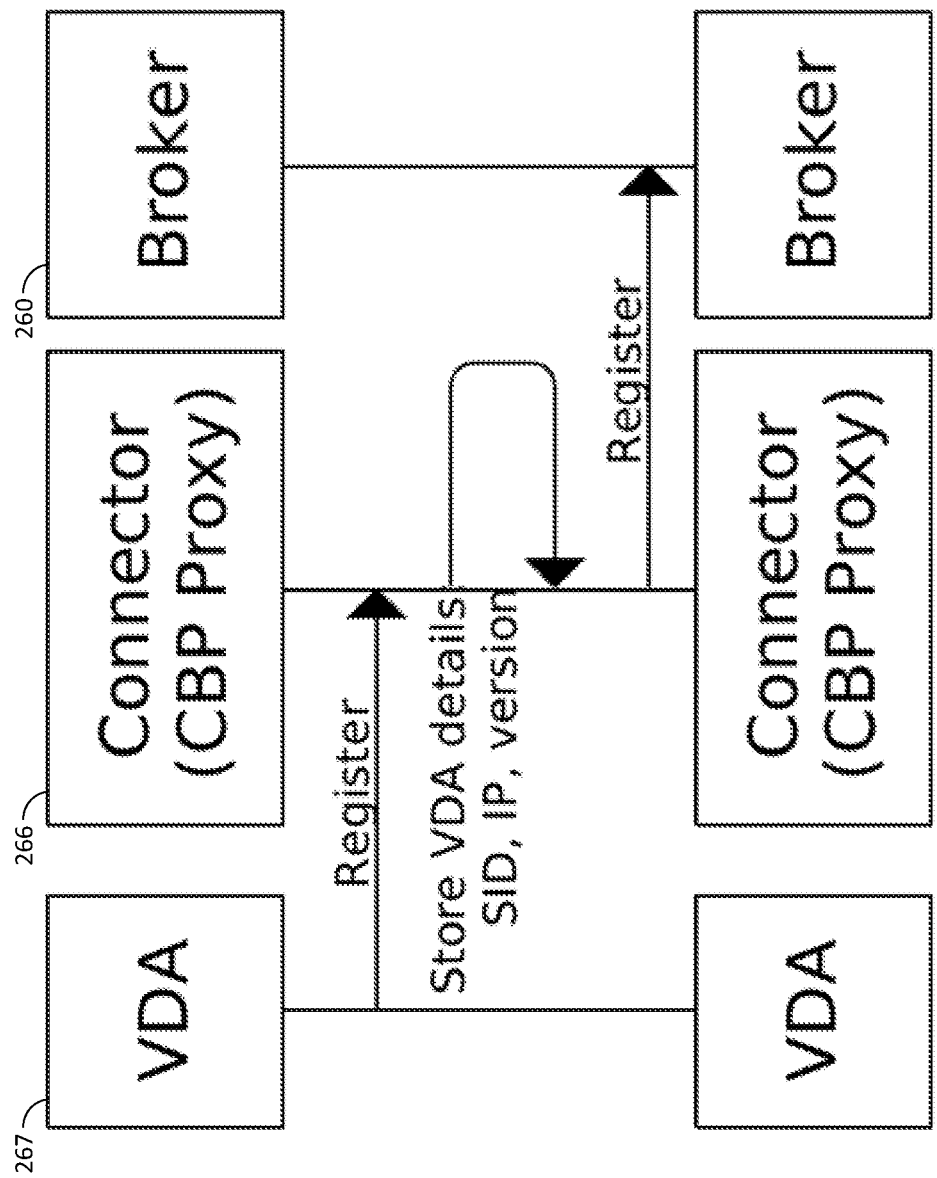
FIG. 11 is a sequence flow diagram illustrating an example approach for broker registration in the connection lease architecture of FIG. 8.

Registration of a legacy virtual delivery appliance 267 with the broker 260 by the connector 266 is now described with reference to FIG. 11. The legacy virtual delivery appliance 267 provides its registration information to the connector appliance 266, and more particularly the BP proxy module 275. The connector appliance 266 stores the details of the legacy virtual delivery appliance 267, such as IDs, network IP addresses, versions, etc. The connector appliance 266 may then connect to the broker 260 to convey this information and register the legacy virtual delivery appliance 267. From this point on, when the CLIS 258 assigns the legacy virtual delivery appliance 267 to a client device 252 as part of a connection lease, the connection lease may advantageously include a network IP address of the connector 266, such that the client device directs its session request to the connector appliance 266. On the other hand, if the CLIS 258 assigns a connection lease enabled virtual delivery appliance 253 to the client device 252, the connection lease may include the direct network IP address of such virtual delivery appliance, and the client device may contact this virtual delivery appliance without going through the connector appliance 266.

In some implementations, consistent with the alternative approach described in FIG. 9B and as previously discussed, when the broker 260 is online, the connector appliance 266 may not have to store the details of the legacy virtual delivery appliance 267, such as IDs, network IP addresses, versions, etc. Instead, the connector appliance 266 could simply relay these details to the broker 260. However, in broker 260 offline conditions, the legacy virtual delivery appliance 267 will register with the connector appliance 266 (instead of the broker 260), e.g., using legacy mechanisms supported by the CBP protocol by Citrix, and the VDA details could be stored at the connector appliance 266. Broker 260 offline conditions are further discussed later in reference to FIGS. 14A and 14B.

Figure 12A:
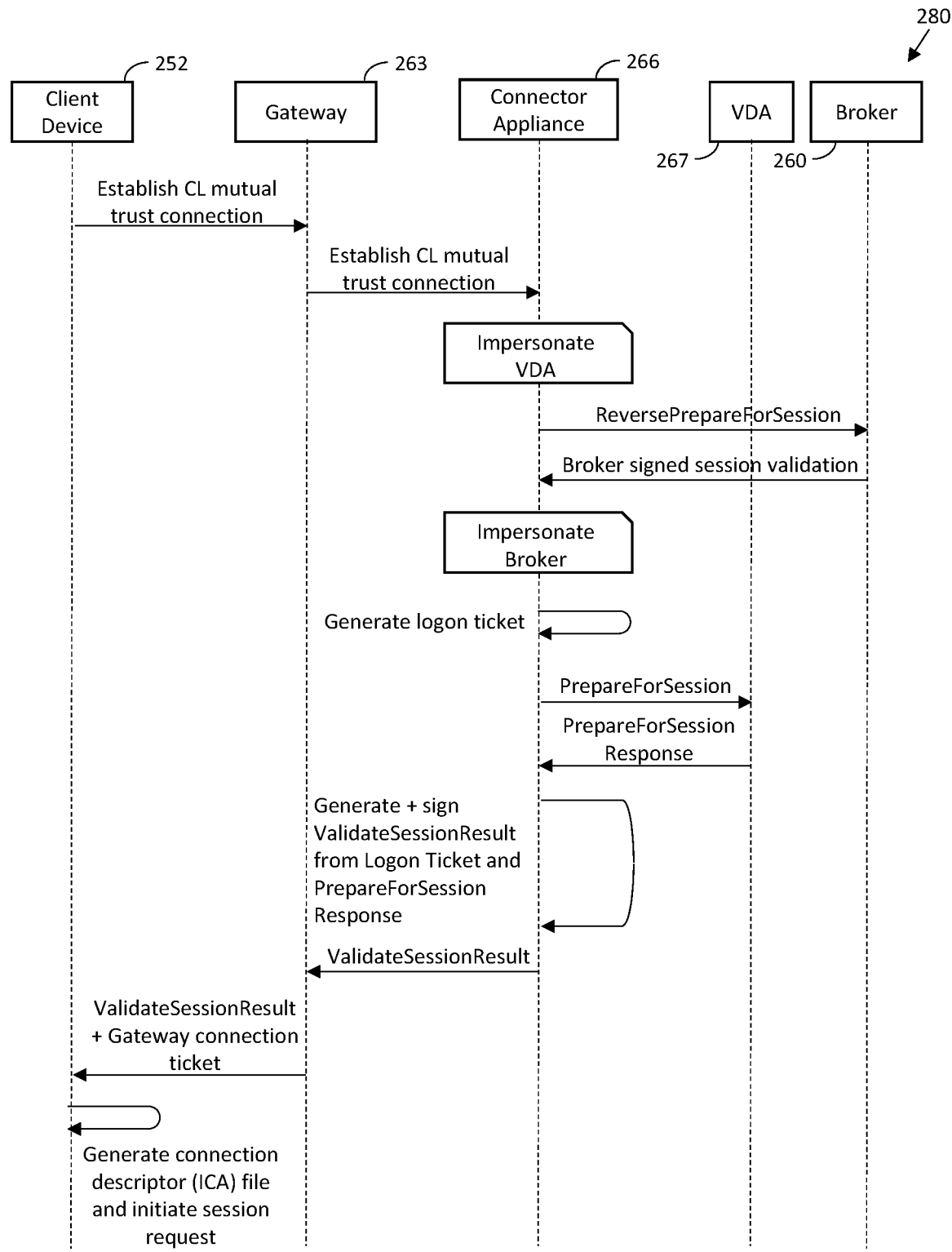
FIGS. 12A and 12B are sequence flow diagrams illustrating example gateway connection sequences for the connection lease architecture of FIG. 8 where the broker does not communicate directly with the virtual delivery appliance, and where the broker does have some direct communication with the virtual delivery appliance.

Different approaches may be used for connecting the client device 252 to the legacy virtual delivery appliances 267 in different embodiments. An example implementation where the connection is handled through the gateway 263 is now described with reference to the sequence flow diagram 280 of FIG. 12A. It should be understood that in alternative embodiments, the gateway service 259 could be used instead of or in addition to the gateway 263. The client device 252 establishes a connection lease mutual trust connection with the gateway 263 (or gateway service 259), which in turn establishes a similar connection with the connector appliance 266, as discussed above. The connection lease will include the network addresses or fully qualified domain name (FQDN) of the gateway 263 (or gateway service 259) and connector appliance 266 assigned to the client device 252. In some embodiments, the connector appliance 266 may perform validations of the connection lease, such as checking the connection lease against expiration (e.g. checking expiration date) or tempering (e.g. checking signature). In different embodiments the connection lease validations at the connector appliance 266 may be formed by the BP module 275 or the host 273. The connector appliance 266 then impersonates or emulates a connection lease enabled virtual delivery appliance 253 to the broker 260 in a session validation request (ReversePrepareForSession), as described above.

Assuming the session is authorized, the broker 260 then signs and returns a session validation to the connector appliance 266, which then impersonates or emulates the operations of the broker 260 to the legacy virtual delivery appliance 267. More particularly, the connector appliance 266 may generate a logon ticket and use it to encrypt user credentials that may have been provided by the client device 252. The connector appliance 266 then instructs the legacy virtual delivery appliance 267 to prepare for a session with the client device 252 (and optionally provides the encrypted user credentials and a hash of the logon ticket), and the legacy virtual delivery appliance 267 responds accordingly. The legacy virtual delivery appliance 267 may start the listeners (e.g. the HDX listeners) and may return machine details such as Internet Protocol (IP) address and port to connect to, information on which protocol to use (e.g. Transmission Control Protocol (TCP) or Enlightened Data Transport (EDT) by Citrix), etc. The connector appliance 266 may then generate and sign a validated session result (ValidateSessionResult) from the logon ticket and the response to the PrepareForSession command, which it then forwards to the gateway 263 (or gateway service 259). The gateway 263 (or gateway service 259) generates a gateway connection ticket and forwards this along to the client device 252 along with the ValidateSessionResult. The gateway connection ticket may contain sufficient information to allow the gateway 263 (or gateway service 259) to authorize and route a connection from the client device 252 back to the legacy virtual delivery appliance 267. The gateway connection ticket may be generated based on the contents of the validated session result (ValidateSessionResult). The client device 252 is now able to generate a connection descriptor file (e.g., ICA file) that it can use to access the legacy virtual delivery appliance 267. The connection descriptor file may be generated based on the connection lease and the validated session result. The client device 252 then initiates a session request to the legacy virtual delivery appliance 267 (e.g., via an HDX connection) through the gateway 263 using the gateway connection ticket. The client device 252 may also supply the logon ticket, extracted from the validated session result, to the legacy virtual delivery appliance 267 for single sign on into the virtual session. For example, the legacy virtual delivery appliance 267 may generate a hash of the logon ticket, find the stored encrypted user credentials based on the logon ticket hash, use the logon ticket to decrypt the credentials and provide the credentials to a virtual session authentication subsystem (e.g. a credential provider or credential provider filter).

Figure 13A:
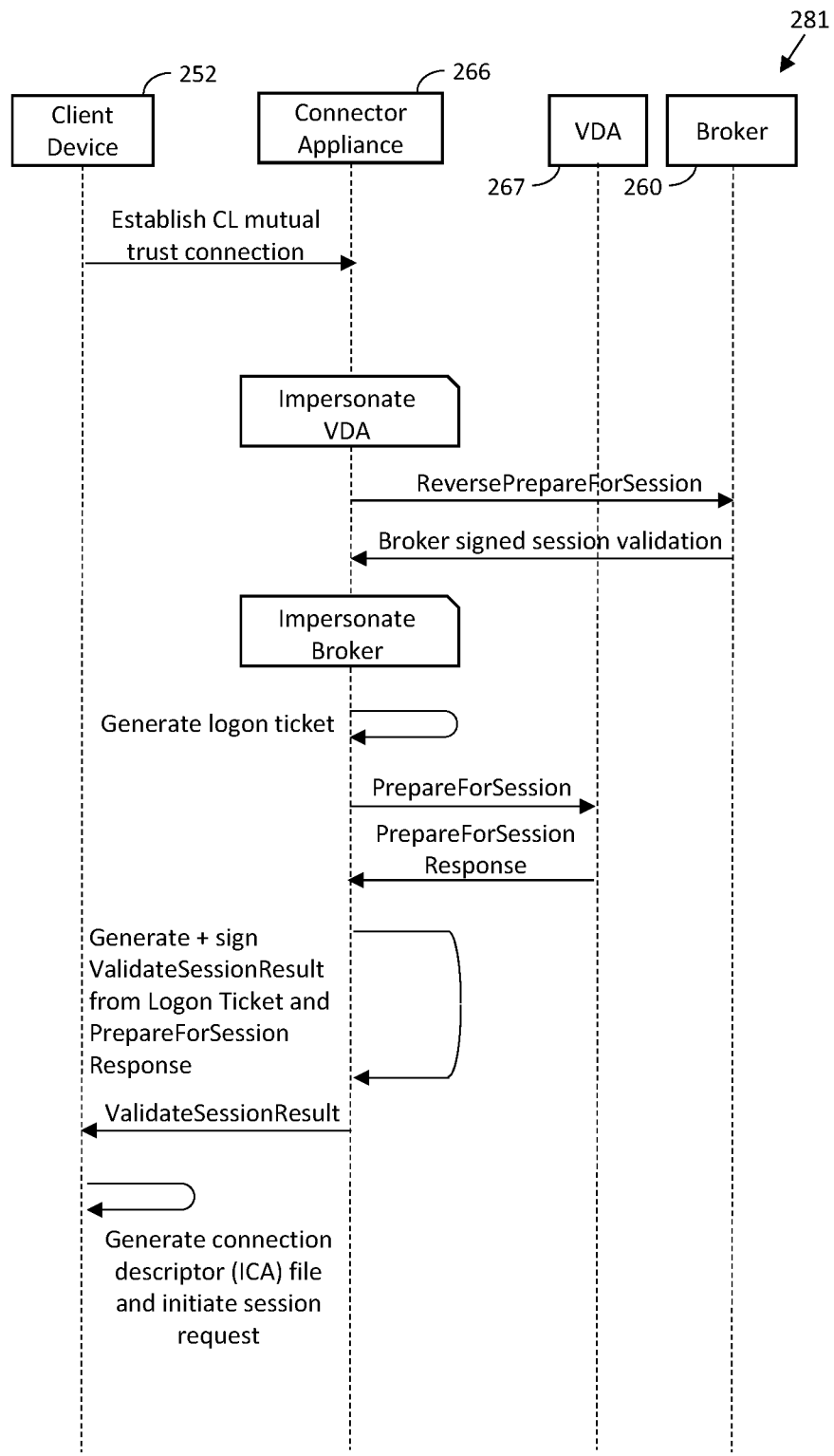
FIGS. 13A and 13B are sequence flow diagrams illustrating example direct connection sequences for the connection lease architecture of FIG. 8 where the broker does not communicate directly with the virtual delivery appliance, and where the broker does have some direct communication with the virtual delivery appliance.

Another example approach is illustrated in the sequence flow diagram 281 of FIG. 13A, in which there is no gateway 263 (or gateway service 259). The above-described operations with respect to FIG. 12A remain the same, with the exception that the client device 252 and connector appliance 266 establish a connection lease mutual trust connection directly between themselves to exchange the above-noted information, and that the client devices initiate the sessions directly with the legacy virtual delivery appliances 267 (e.g., via an HDX connection). Since there is no gateway 263 (or gateway service 259) involved in the illustrated flow, a gateway connection ticket is not generated and is not needed. Various approaches may be used for establishing a mutual trust connection, including the use of a secure tunnel (e.g., a Connection Lease Exchange and Mutual Trust Protocol (CLXMTP) by Citrix, an ICA protocol tunnel, etc.) within one or more transport layers implemented using Transport Layer Security (TLS)/Transmission Control Protocol (TCP), Common Gateway Protocol (CGP) by Citrix, etc.

Figure 12B:
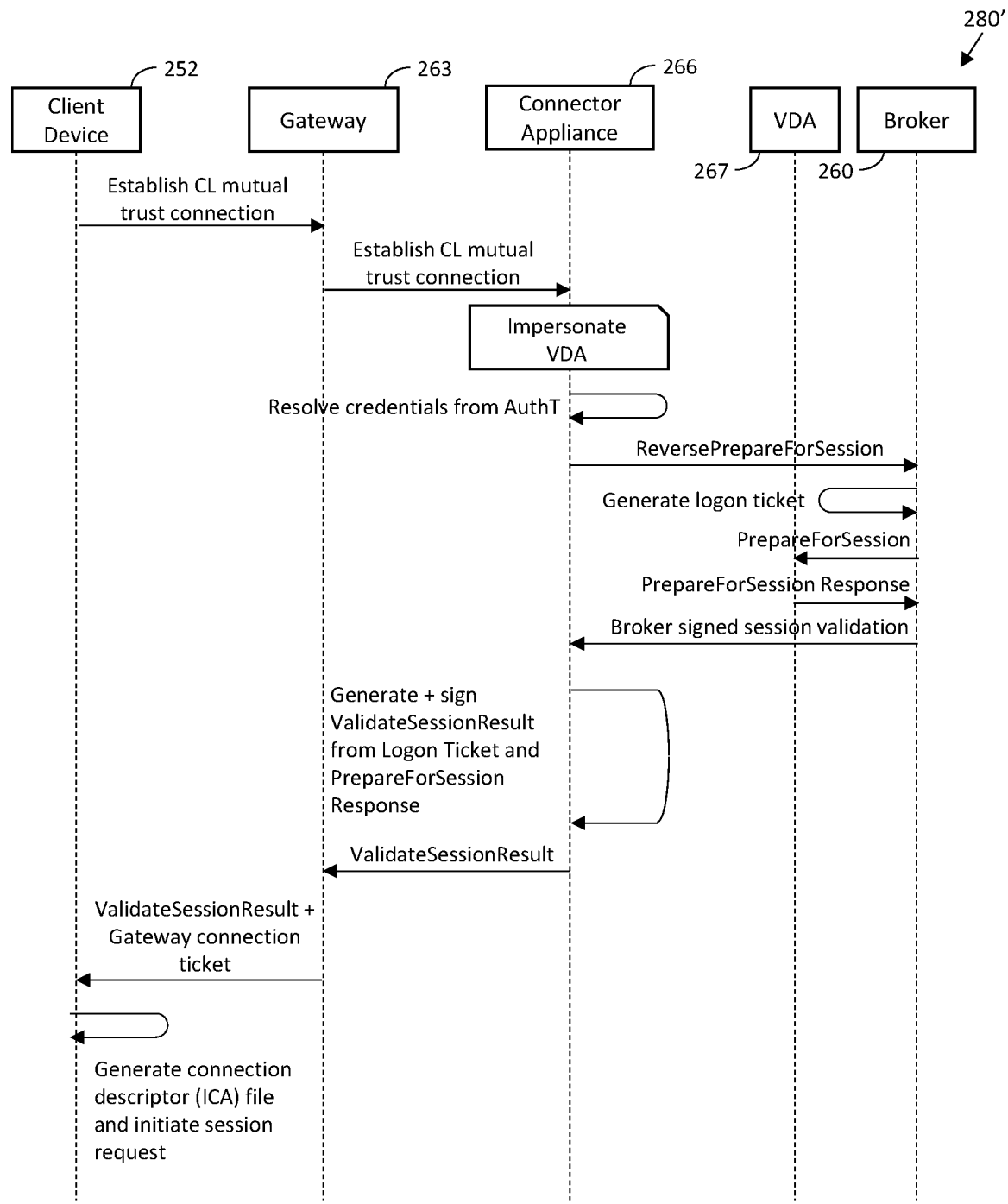
Figure 13B:
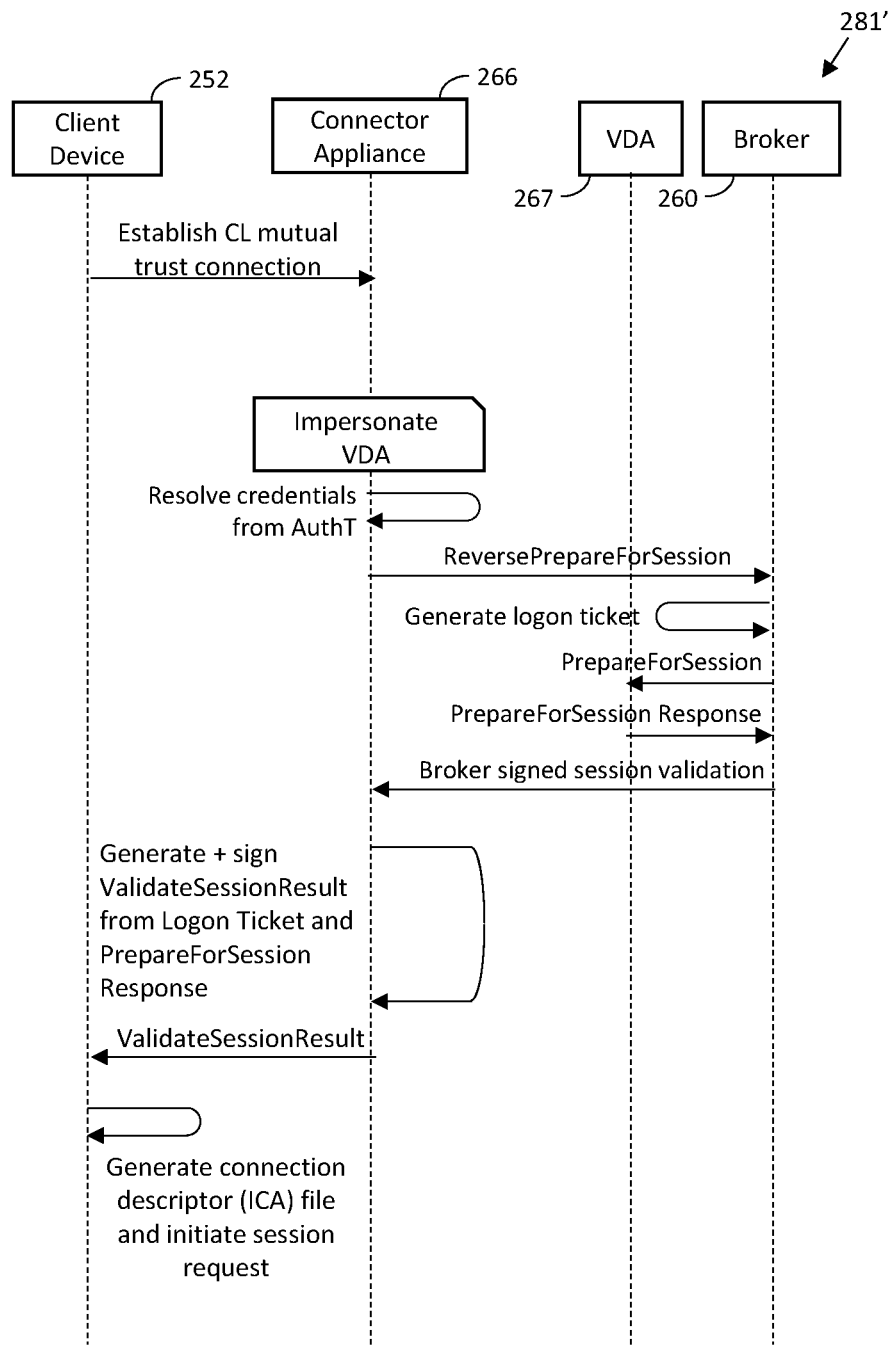

Alternative implementations consistent with the alternative approach described in FIG. 9B, are now described with reference to the sequence flow diagram 280' of FIG. 12B and the sequence flow diagram 281' of FIG. 13B (no gateway). The differences compared to the sequence flow diagram 280 of FIG. 12A and the sequence flow diagram 281 of FIG. 12B respectively, are that in the flows 280' and 281' the connector appliance 266 resolves the user credentials from an authentication token and provides them to the broker 260, the broker 260 creates a logon ticket based on the user credentials as previously described, and the broker 260 performs the "PrepareForSession" call to the legacy virtual delivery appliance 267.

In some implementations, another type of connection approach may be used, such as when the connector appliance 266 is behind a firewall and is not directly accessible by the client device 252. More particularly, the mutual trust connection is established from the workspace app 270 via the gateway 263 (or gateway service 259) to the connector appliance 266. In some embodiments, this may be possible because the firewall may allow inbound connections to the connector appliance 266 from an IP range of the gateway 263 (or gateway service 259). For security reasons, this may more commonly be the case with the gateway 263 (e.g. an on-premises gateway appliance) and is rarely the case with gateway service 259. In other embodiments, this may be possible because the connector appliance 266 may have a permanent authenticated outbound transport connection with the gateway 263 (or gateway service 259) that is allowed by the firewall and may be used to exchange control messages. In other words, while the firewall may not allow any inbound transport connections to the connector appliance 266 for security reasons, it may still allow outbound transport connections. Furthermore, upon demand, e.g. based on a control message from the gateway 263 (or gateway service 259), the connector appliance 266 may establish an additional outbound transport connection, which is also allowed by the firewall. This additional transport connection could then be used by the gateway 263 (or gateway service 259) to perform the connection lease mutual trust protocol. This is similar to the gateway-resolved gateway 263 (or gateway service 259) launch described above with respect to FIGS. 12A and 12B. However, here the mutual trust protocol instructs the gateway 263 (or gateway service 259), e.g., with a type-length-value (TLV) capability, that this will eventually be a direct connection to the legacy virtual delivery appliance 267, and accordingly that no gateway connection ticket is to be generated.

With this approach, the gateway 263 (or gateway service 259) is advantageously used to contact the connector appliance 266 in order to resolve the connection lease, but the eventual connection is still direct to the virtual delivery appliance 267 (e.g., via HDX), which helps to avoid a potential performance degradation by having to route the connection through the gateway 263 (or gateway service 259).

In still another configuration approach, the mutual trust connection is performed from the workspace app 270 via the gateway 263 (or gateway service 259) to the connector appliance 266 as before. However, the mutual trust protocol in this implementation instructs the gateway 263 (or gateway service 259) (e.g., with a TLV capability) that this may (but not necessarily) eventually be a direct connection. As such, the gateway 263 still generates a gateway connection ticket. The workspace app 270 then performs either or both of the following steps: (1) generate a first connection descriptor (e.g., ICA) file and perform a direct connection to the legacy virtual delivery appliance 267; and/or (2) generate a second connection descriptor (e.g., ICA) file and perform the connection to the legacy virtual delivery appliance 267 via the gateway 263 (or gateway service 259) using the gateway connection ticket. This approach avoids two round-trips involving the client device-gateway-connector appliance-broker-virtual delivery appliance by consolidating the connection resolution into a single round-trip and performing any session launch(es) with potential fallbacks subsequently at the workspace app 270.

In some implementations, the connection lease launch may not be the default code path, while connection descriptor (e.g., ICA) files are still the first choice. For example, if SSOn to the virtual computing sessions at virtual delivery appliances 267 is not available in conjunction with using connection leases to the connector appliance 266 (e.g. the connector appliance 266 version does not support generation of logon tickets, or the client device 252 version does not support secure transmission of user credentials), users may prefer connection descriptor file launches and use connection leases only as a fallback for resiliency in cases of outage. Otherwise, without SSOn support, users may have to interactively enter their credentials at the virtual sessions after every launch. However, using connection leasing only in case of outage, which is normally a rare occurrence, would restrict the ability to collect telemetry data regarding connection lease resolutions, e.g., whether connection leases and keys are being successfully synced to the workspace app 270, are connection lease launches going to be successful (if attempted), what type of launches succeed and what fail and the reasons for failure, what is the connection lease resolution time, etc.

To address this issue, the workspace app 270 may advantageously perform a silent connection lease resolution that is not user-driven, but for telemetry-gathering purposes only. In other words, the workspace app 270 may automatically trigger the connection lease resolution in the background without explicit user request and without providing any indication to the end user such as progress bars, status indicators, error messages, etc. The workspace app 270 may, e.g., by using a TLV capability in the mutual trust protocol, instruct the gateway 263 (or gateway service 259) or the connector appliance 266 (for gateway-resolved and connector appliance-resolved launches, respectively) that this is only a telemetry-gathering launch for the purpose of gathering information about connection lease resolution times, etc., prior to actually requesting a virtual session. The gateway 263 (or gateway service 259) and connector appliance 266 operate as normal, except that they may not necessarily contact the broker 260. The reason being that otherwise the broker 260 may need to be made aware of the telemetry launch in order to avoid skewing of any load-balancing techniques, and falsely contacting legacy virtual delivery appliances 267 with prepare for session requests.

The workspace app 270 also operates as normal, except that after receiving a successful ValidateSessionResult following a telemetry request, the workspace app 270 need not perform an actual launch. The workspace app 270 may initiate silent connection lease resolution periodically in the background, or in parallel to an actual user connection descriptor (e.g., ICA) file launch, or after a short delay following an actual user connection descriptor file launch. Components may log telemetry data points on the usage of connection leases as normal, except that data points may also be marked to indicate that connection lease usage is not user-driven, but for telemetry only purposes.

Furthermore, to help improve connect time, the workspace app 270 may in some embodiments ping one or more connector appliances 266 listed in the connection leases to determine if it is internal (e.g., on a same LAN) or external. The ping may be performed periodically and/or upon launch, e.g., while the gateway-resolve is taking place, which under most circumstances would take longer than a ping. Based on the results from the ping, the workspace app 270 may override the default instructions in the connection lease and instead request a virtual session from a different connector appliance 266 or virtual delivery appliance 253. By way of example, the "ping" may be performed using the Internet Control Message Protocol (ICMP), although other suitable approaches may also be used in different embodiments. For example, ICMP does not support ports. However, the workspace app 270 may need to also check if a specific connection lease mutual trust protocol port on a connector appliance 266 is open. In some implementations, the workspace app 270 may check if the (remote) network port is open and listening or not by performing the equivalent of telnet command (open <IP address> <port>), or PowerShell Test-NetworkConnection command (tnc <IP address>-port <port>).

As noted above, connector appliances 266 and virtual delivery appliances 253, 267 may be arranged in different zones. A zone includes one or more connector appliances 266 and virtual delivery appliances 253 and/or 267 which are grouped together and assigned to service a particular geographical region, customer, facility, etc. A successful ping of a connector in Zone A only guarantees that virtual delivery appliances 253, 267 in Zone A are accessible. The workspace app 270 may not know ahead of time the resolved virtual delivery appliances 253, 267 and their zone association. As such, the workspace app 270 may ping the connector appliances 266 in different zones and maintain a map (internal/external) with respect to each zone, for example.

In addition to the resolved virtual delivery appliances 253, 267 addresses coming back from the broker 260 (or LHC 278 in the case of a broker outage) to the proxy 274, the Reverse Prepare for Session protocol command (or in other implementations the "Resolve Address" NfUse protocol command), also includes the virtual delivery appliances 253, 267 zone mapping. This zone information is inserted in the ValidateSessionResult, so the workspace app 270 may determine which zone the virtual delivery appliance 253 or 267 belongs to. Moreover, using the zone information from ValidateSessionResult, the workspace app 270 may query its internal map to determine if it is external/internal with respect to the resolved VDA.

Various prioritization enhancements may be used in different embodiments. In one example approach, the workspace app 270 may attempt a gateway-resolved direct launch first, followed by a gateway-resolved gateway 263 (or gateway service 259) launch. Alternately, the workspace app 270 may attempt a gateway-resolved combined gateway/direct launch, while still favoring a direct launch. Furthermore, the workspace app 270 may attempt a connector-resolved direct launch.

One reason for still attempting a connector-resolved direct launch is that if the gateway 263 (or gateway service 259) is down (in that unavailable or there is no available connection to it) or if a customer's Internet connection is down, the only option left is to try to communicate to the connector appliance 266, which may work if the connector appliance is directly accessible from the workspace app 270 (e.g., because of relaxed firewall restrictions).

As a further improvement, to determine if a set of connector appliances 266 is accessible, the workspace app 270 may ping the connector appliance(s) and keep a zone mapping, as described above. This helps steer the decision of direct versus gateway 263 (or gateway service 259) launch once the virtual delivery appliance 267 has been resolved, and also steers the decision of whether to prioritize a direct launch, which may be faster than a gateway resolution.

In still another alternative, the workspace app 270 may use a Network Location Service (NLS) to determine if it is remote or local with respect to connector appliances 266 (and therefore virtual delivery appliances 253, 267 in the respective zones). This information may then be used to decide between a gateway-resolved direct launch plus connector appliance-resolved direct launch (if internal) versus a gateway-resolved gateway launch (if external). For example, in some embodiments, an NLS may be implemented as a cloud service where the network locations of the connector appliances 266 and the virtual delivery appliances 253, 267 may be configured with the NLS. These network locations may correspond to the public IP ranges of the networks where the client devices 203a-203n will be connecting from internally (e.g. company network at office or branch locations). Prior to starting the connection lease resolution or periodically, a client device 252 may contact the NLS. The NLS may detect whether the client device 252 is internal or external with respect to the configured network locations based on the public IP address of the network from which the client device 252 is connecting. The NLS may then return to the client device 252 an indication of whether it is currently internal or external with respect to the configured network locations. However, if the NLS is down or otherwise there is no connection between the client device 252 and the NLS (e.g. no Internet), then the client device 252 will not be able to use the NLS and will not know whether it is internal or external. Therefore, a cloud-based NLS implementation would have a limited value, e.g. only during online conditions. Because connection leasing is expected to also work in offline conditions (e.g. no Internet or cloud services down), a different approach may be required as further described below.

In still another alternative, the workspace app 270 may perform the different types of resolutions in parallel, in order to both help optimize connection time and satisfy HDX performance. If a less advantageous connection (e.g., via a gateway 263 or gateway service 259) is available first, while a direct connection becomes available moments later, the workspace app 270 may switch over from the gateway connection to the direct connection. For example, in some implementations, the switch may be performed using a forced CGP disconnect followed by silent CGP (Session Reliability) reconnect. In particular, the client device 252 may deliberately (forcefully) disconnect the transport connection used by the CGP protocol to the gateway without terminating the CGP presentation-level protocol session itself. The client device 252 could then use the already established direct connection to resume the CGP session, e.g. using the CGP Session Reliability HDX feature commercially available from Citrix. Furthermore, rather than switching from a gateway 263 (or gateway service 259) to a direct connection, the workspace app 270 may maintain multiple parallel connections (multi-path). This not only optimizes connection time but also allows the use of multiple aggregate bandwidths. Multi-stream ICA (MSI) may be enabled over the different parallel connections.

Figure 14A:
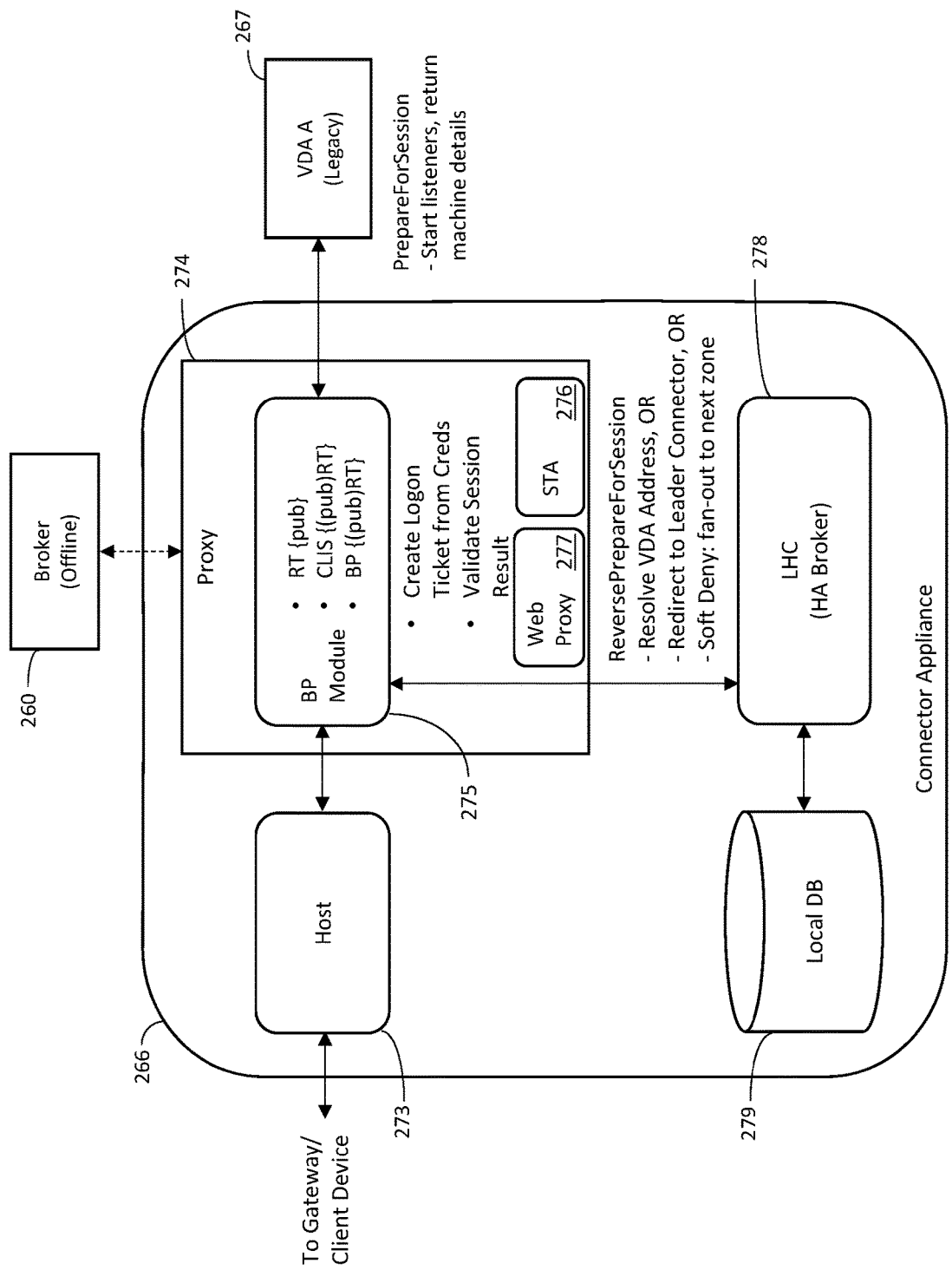
FIGS. 14A and 14B are schematic block diagrams of the connector appliance of the connection lease architecture of FIG. 8 operating in a broker offline mode in example embodiments where the broker does not communicate directly with the virtual delivery appliance, and where the broker does have some direct communication with the virtual delivery appliance.
Figure 14B:
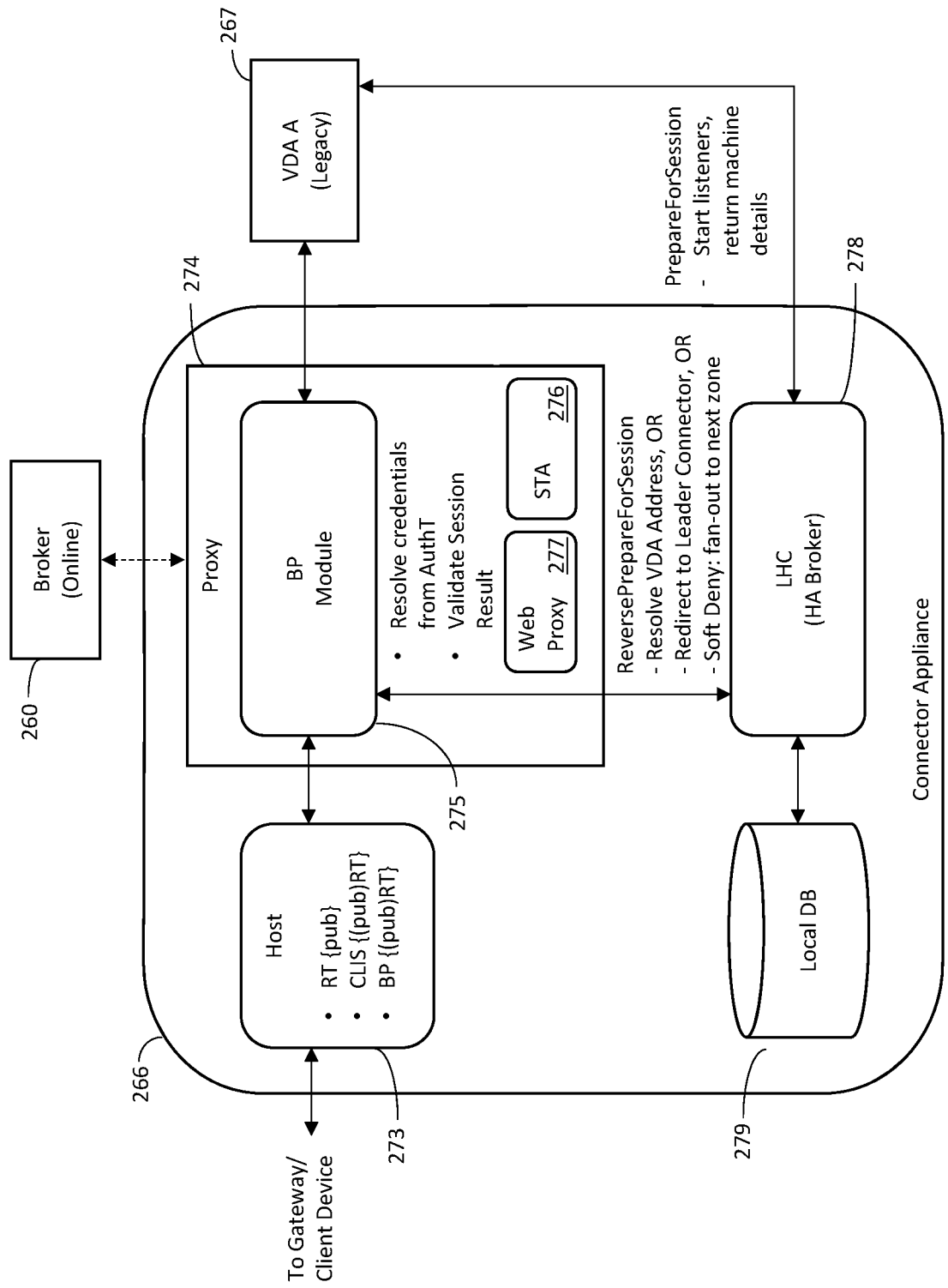

Turning now to FIGS. 14A and 14B, options the connector appliance 266 may employ when the broker 260 is unavailable (offline) are now discussed. In the example shown in FIGS. 9A and 9B, the broker 260 is available (online), and the LHC 278 is not used. However, when the broker 260 is offline as shown in FIGS. 14A and 14B, the connector appliance 266 may take over the role of the broker to some extent by falling back to the LHC 278. In particular, starting with FIG. 14A, the connector appliance 266 may in some instances assume the reverse prepare for session operations of the broker 260 by resolving the virtual delivery appliance 267 address as discussed above. In other instances, the connector appliances 266 in the same zone may elect a leader connector appliance for that zone. For example, in some implementations, the connector appliances 266 may periodically contact each other via broadcast and elect the first connector appliance 266 in alphabetical order to be the leader. The leader election may be performed both while the broker 260 is available (online) and when the broker 260 is unavailable (offline). This is because a leader connector appliance 266 may go down, may be in the process of software update, or new connector appliances 266 may be added to the zone, e.g. to improve scalability. As previously discussed, all connector appliances 266 maintain their own local database 279, which is synchronized with the broker 260 when it is available (online). However, during broker 260 offline (outage) conditions, no such synchronization could take place. The connector appliances 266 may not synchronize their local databases 279 between each other, e.g. as virtual session information is continuously updated during the outage with information on active sessions, disconnected sessions, etc. Instead, the local database 279 of the single leader connector appliance 266 may be used to resolve all connection lease requests, thus becoming the only local database 279 in the zone that is being actively updated during the outage and advantageously avoiding database 279 synchronization issues. If the connector appliance 266 receiving the session request is not the leader, then it may re-direct the request to the leader in the event of a broker 260 outage. For example, this may be done through a "redirect target" code, which instructs the workspace app 270 or gateway 263 (or gateway service 259) to perform the mutual trust connection to a new target (leader) connector appliance 266.

If the connection lease identifies a resource that is published for a virtual delivery appliance 267 in a different zone than the zone of the leader connector appliance 266, then the leader connector appliance 266 may not be able to resolve the virtual delivery appliance 267 address. Only when the broker 260 is available (online), the broker 260 is able to directly resolve VDA addresses in different zones, or the broker 260 may re-direct to a connector appliance 266 in the appropriate zone. However, the leader connector appliance 266 may implicitly re-direct the session request to another zone, for example. This may be done through a "soft deny" code and a "zone failover" sub-code, which instructs the workspace app 270 or gateway 263 (or gateway service 259) to perform the mutual trust connection to a next (new) target connector appliance 266 that is listed in the connection lease under a next zone grouping of connector appliances, for example. In other words, the workspace app 270 or gateway 263 (or gateway service 259) perform fallback to other options listed in the connection lease, thereby redirecting themselves to a connector appliance 266 in a different zone that may be capable of resolving the connection lease. This may be either because it is their zone, or because they happen to have connectivity to the broker 260 which is up and running. In particular, advantageously a leader connector appliance 266 in a next zone will attempt to resolve the connection lease to a virtual delivery appliance 267 address. The process may continue until a leader connector appliance 266 in a next zone successfully resolves the virtual delivery appliance 267 address, all zones are exhausted, or a timeout for the overall connection lease resolution process occurs. It is also possible that while the process continues a connector appliance 266 in a next zone is able to contact the broker 260, e.g. if the outage condition is resolved and the broker 260 is back online, in which case the broker 260 will resolve the virtual delivery appliance 267 address, as previously illustrated in FIGS. 9A and 9B.

In yet another case, the connector appliance 266 may reply to the client device 252 or the gateway 263 (or gateway service 259) with a "soft deny" responsive to the session request. This causes the client device 252 or the gateway 263 (or gateway service 259) to "fan-out" its session request to another connector appliance 266, such as in another zone which may have access to the broker 260, for example. More particularly, a fan-out occurs following the "soft deny" return code in the ValidateSessionResult. The workspace app 270 or the gateway 263 (or gateway service 259) may perform the mutual trust protocol connection to the next option (e.g., connector appliance 266) in the connection lease.

In some embodiments, combinations of these responses may be used. For example, following a "redirect target" the target connector appliance 266 may issue a "soft deny". For example, even if the target connector appliance 266 is a leader, it could fail to validate the lease, e.g. the connection lease validity date may be considered expired if the connector appliance 266 experiences a clock drifting issue where its clock is incorrectly set at a future time, or the connection lease signature may be considered invalid if the connector appliance 266 experiences issues with missing or stale keys. In this case the workspace app 270 or gateway 263 (or gateway service 259) initiates or resumes a fan-out. To avoid loops, the fan-out may resume from the last option in the connection lease prior to the "redirect target". In addition, the fan-out may omit any options in the connection lease that have already been tried, e.g. as a result of redirect target. In other words, the workspace app 270 or gateway 263 (or gateway service 259) may advantageously maintain a fan-out state until either "allow-target" or "deny" are returned, thus terminating the target options. The initial/ starting fan-out state may be the first option (e.g., connector appliance 266) in the connection lease. Moreover, further to the telemetry discussion above, it should be noted that in addition to "allow-target", the workspace app 270 or gateway 263 (or gateway service 259) or connector appliance 266 may also artificially issue "deny", "deny" with retry period, "soft deny", or "redirect-target" return codes in order to steer and fully analyze workspace app behavior and resiliency with connection leases.

Another example implementation of the connector appliance 266 is now described with reference to FIG. 14B. FIG. 14B is very similar to the implementation described in FIG. 14A. In both FIG. 14A and FIG. 14B, the cloud computing service 250 (and, more particularly, the broker 260) is offline and unavailable to perform connection lease validation. As previously discussed, when the broker 260 is offline as shown in FIGS. 14A and 14B, the connector appliance 266 may take over the role of the broker to some extent by falling back to the LHC 278. However, the key difference according to FIG. 14B, is that the LHC 278 talks to the legacy virtual delivery appliances 267 using a legacy (unmodified) call (e.g. "PrepareForSession"), rather than the connector appliance 266, and in particular the proxy 274, impersonating the LHC 278 to talk to the legacy virtual delivery appliances 267. An additional example difference illustrated in FIG. 14B is that the connector appliance 266 resolves the user credentials from an authentication token and provides them to the LHC 278, the LHC 278 then creates a logon ticket based on the user credentials as previously described. Yet another example variation illustrated in FIG. 14B is that the keys used in the connection lease mutual trust protocol and lease validation (e.g. signature checks) are stored in the host 273.

Figure 15:
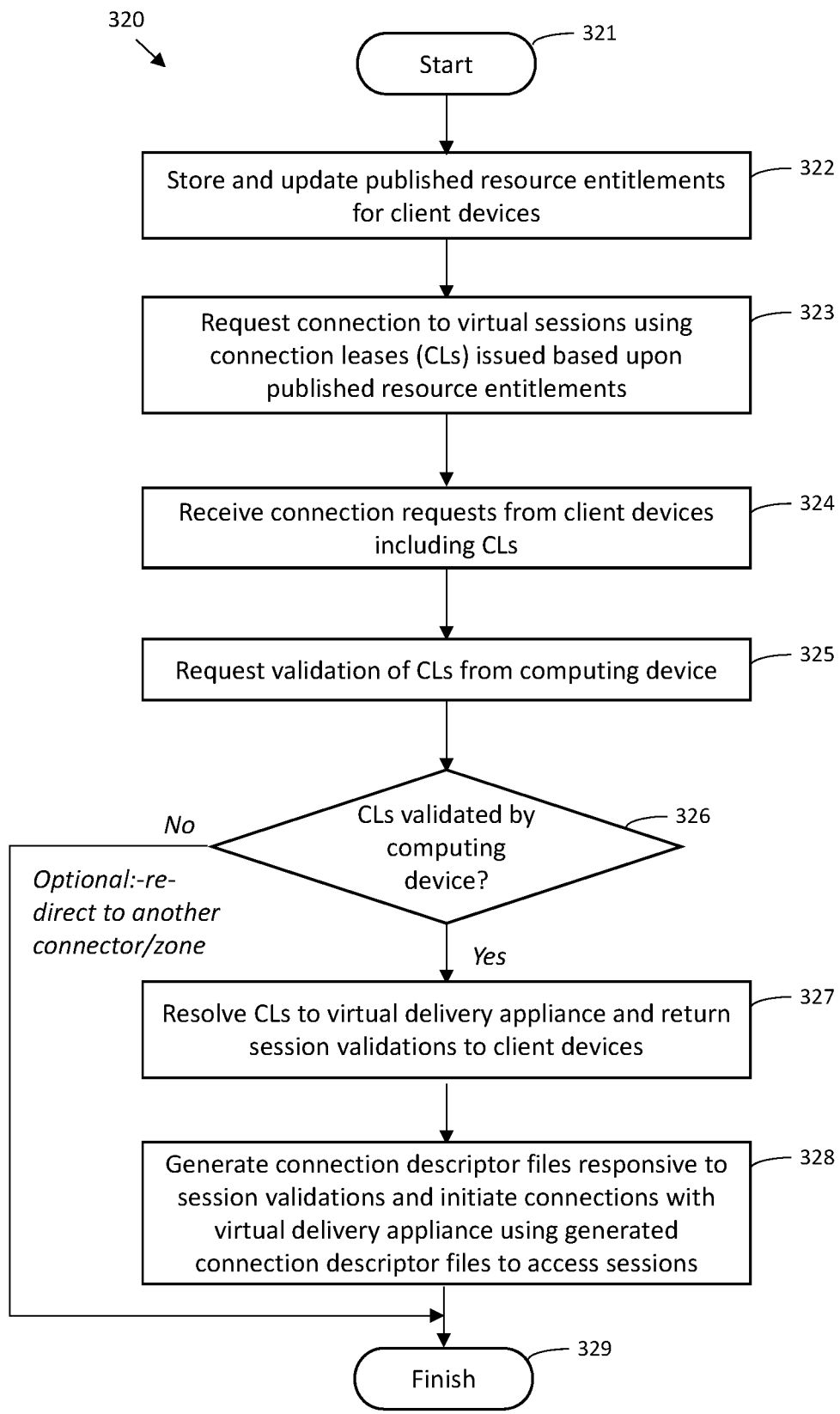
FIG. 15 is a flow diagram illustrating example method aspects associated with the system of FIG. 6.

Turning now to the flow diagram 320 of FIG. 15, a related method begins (Block 321) with storing and updating published resource entitlements for client devices 203a-203n at a computing device 201, at Block 322, and requesting connections from the client devices to virtual sessions using connection leases issued based upon the published resource entitlements, as discussed above (Block 323). The method further illustratively includes, at the connector appliance 206, receiving connection requests from the client devices 203a-203n including the connection leases, at Block 324, and requesting validation of the connection leases from the computing device 201, at Block 325. Responsive to validation of the connection leases by the computing device 201, at Block 326, the connection leases may be resolved to a virtual delivery appliance 204 and a session validation may be returned to the client devices 203a-203n, at Block 327. As discussed above, at Block 326, the connector appliance 206 may perform additional validations of the connection leases, such as checking the connection leases against expiration (e.g. checking expiration date) or tempering (e.g. checking signature). In addition, as discussed above, at Block 327, the resolution of the connection leases to the virtual delivery appliance 204 may be performed by the computing device 201 and returned to the connector appliance 206, prior to the connector appliance 206 returning the session validation to the client devices 203a-203n. In addition, as discussed above, at Block 327, when the computing device 201 is offline, the resolution of the connection leases to the virtual delivery appliance 204 may be performed by the connector appliance 206. As discussed above, the virtual delivery appliance 204 is configured to provide the client devices 203a-203n with access to the virtual sessions based upon connection descriptor files, rather than connection leases. However, the connection descriptor files may be generated at the client devices 203a-203n responsive to the session validations, and the connections with the virtual delivery appliance 204 may be initiated using the generated connection descriptor files to access the virtual sessions, at Block 328, as also discussed above. As also noted above, re-directs to other zones may also be performed in the case where the computing device 201 is unavailable to validate a session request (e.g., offline). The method illustrated in FIG. 15 illustratively concludes at Block 329.

Figure 16:
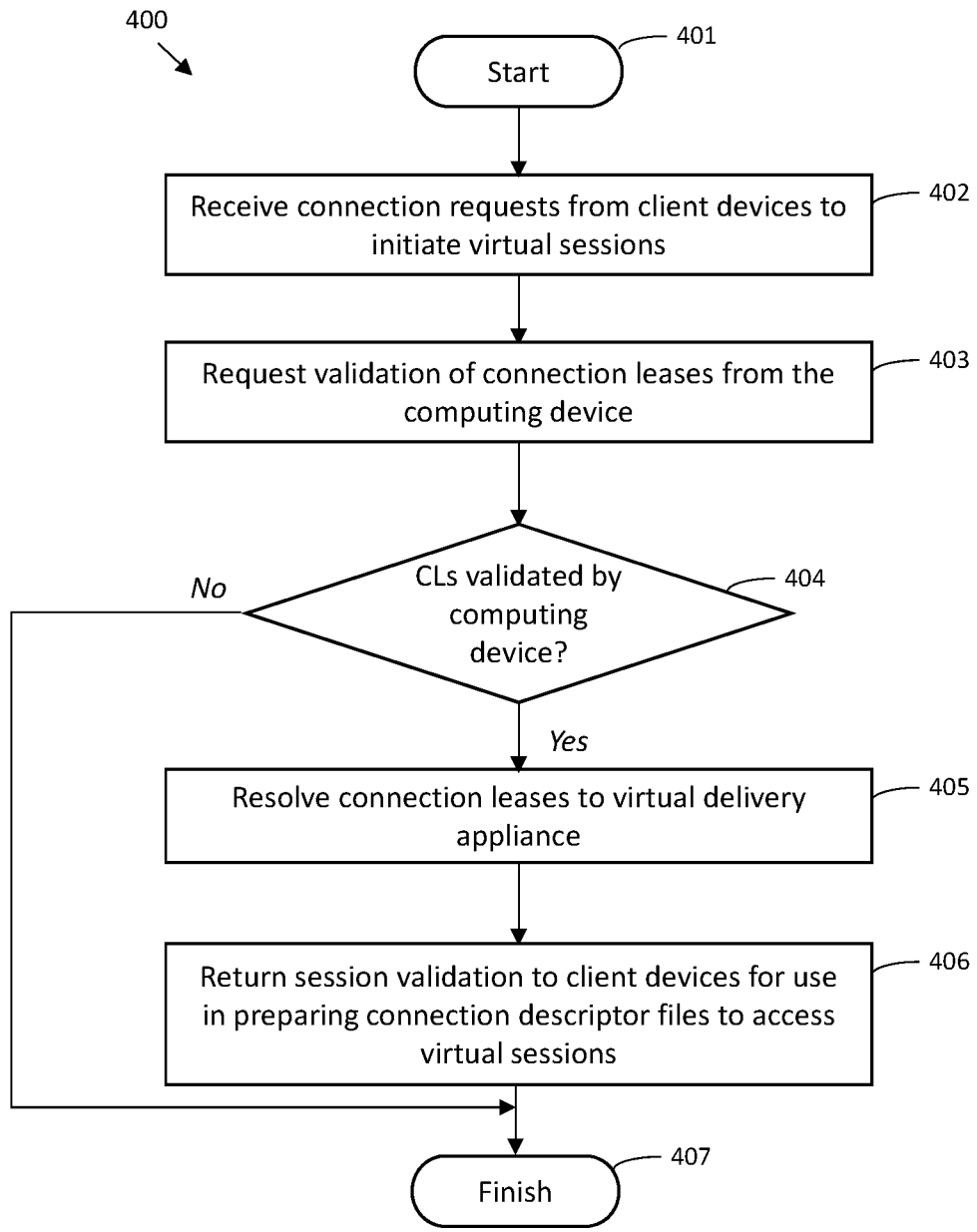
FIG. 16 is a flow diagram illustrating example method aspects associated with the connector appliance of the system of FIG. 6.

Further method aspects related to the operation of the connector appliance 206 are now described with respect to the flow diagram 400 of FIG. 16. Beginning at Block 401, the method illustratively includes receiving connection requests at the connector appliance 206 from the client devices 203a-203n to initiate virtual sessions, at Block 402, and requesting validation of the connection leases from the computing device 201 (Block 403), as discussed above. As discussed above, at Block 403, the connector appliance 206 may perform additional validations of the connection leases, such as checking the connection leases against expiration (e.g. checking expiration date) or tempering (e.g. checking signature). The method further illustratively includes, responsive to validation of the connection leases by the computing device 201 (Block 404), resolving the connection leases to the virtual delivery appliance 204 (Block 405), and returning a session validation to the client devices for use in preparing the connection descriptor files to access the virtual sessions (Block 406), as also discussed further above. In addition, as discussed above, at Block 405, the resolution of the connection leases to the virtual delivery appliance 204 may be performed by the computing device 201 and returned to the connector appliance 206. In addition, as discussed above, at Block 405, when the computing device 201 is offline, the resolution of the connection leases to the virtual delivery appliance 204 may be performed by the connector appliance 206. The method of FIG. 16 illustratively concludes at Block 407.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:
1. A method comprising:
receiving connection requests at a connector appliance from a plurality of client devices to initiate virtual sessions, the connection requests including connection leases issued based upon published resource entitlements, the published resource entitlements for the plurality of client devices being stored and updated by a computing device;
requesting validation of the connection leases at the connector appliance from the computing device;
responsive to validation of the connection leases by the computing device, at the connector appliance, resolving the connection leases to a virtual delivery appliance that is not connection lease compatible, the virtual delivery appliance instead being configured to provide the client devices with access to the virtual sessions based upon connection descriptor files; and
returning a session validation from the connector appliance to the client devices for use in preparing the connection descriptor files to access the virtual sessions;
wherein the virtual delivery appliance comprises a plurality of virtual delivery appliances located in different zones; and wherein the connector appliance comprises a plurality of connector appliances located in the different zones and assigned to virtual delivery appliances in their zones; and further comprising, at the connector appliances, re-directing connection requests to another connector appliance in a different zone without availability of the computing device to authorize connection requests for their own zones.

2. The method of claim 1 wherein the connection descriptor files are generated at the client devices from the connection leases and the session validations.

3. The method of claim 1 wherein receiving comprises receiving by the connector appliance connection requests from the client devices by directly connecting the client devices to the connector appliance using the connection leases.

4. The method of claim 1 wherein receiving comprises receiving by the connector appliance connection requests from the client devices by connecting the client devices to the connector appliance using the connection leases via a gateway appliance.

5. The method of claim 1 wherein the connections are initiated from the client devices to the virtual delivery appliance by directly connecting to the virtual delivery appliance using the connection descriptor files.

6. The method of claim 1 wherein the connections from the client devices to the virtual delivery appliance are initiated via a gateway appliance using the connection descriptor files.

7. The method of claim 1 further comprising, at the connector appliance, generating connection lease resolution data responsive to requests from the client devices.

8. The method of claim 7 wherein the client devices are further configured to request connection lease resolution data from at least one of a gateway appliance and other client devices.

9. The method of claim 7 wherein generating comprises generating the connection lease resolution data based upon at least one of the connection leases and the connection lease resolution data, and wherein the client devices receive the telemetry data without generating session requests responsive thereto.

10. The method of claim 1 wherein the connection leases include a network address of the connector appliance to cause at least some of the client devices to indirectly request connections to the virtual sessions through the virtual delivery appliance via the connector appliance.

11. The method of claim 1 further comprising, at the connector appliance, directing the client devices to proceed to a next option in their connection leases without availability of the computing device.

12. A computing system comprising:
a plurality of client devices executed by at least one processor to request connections to virtual sessions using connection leases issued based upon published resource entitlements;
a computing device executed by a processor to store and update the published resource entitlements for the plurality of client devices;
a virtual delivery appliance that is not connection lease compatible and is instead configured to provide the client devices with access to the virtual sessions based upon connection descriptor files; and
a connector appliance executed by a processor to
receive connection requests from the client devices including the connection leases,
request validation of the connection leases from the computing device, and
responsive to validation of the connection leases by the computing device, resolve the connection leases to the virtual delivery appliance and return a session validation to the client devices;
wherein the client devices are executed by the least one processor to generate the connection descriptor files responsive to the session validations and initiate connections with the virtual delivery appliance using the generated connection descriptor files to access the virtual sessions;
wherein the virtual delivery appliance comprises a plurality of virtual delivery appliances located in different zones; and wherein the connector appliance comprises a plurality of connector appliances located in the different zones and assigned to virtual delivery appliances in their zones; and further comprising, at connector appliances within a same zone, electing a leader connector appliance for the zone, and re-directing received connection requests to the leader connector appliance without availability of the computing device to authorize connection requests for the zone.

13. The computing system of claim 12 wherein the client devices are configured to generate the connection descriptor files from the connection leases and the session validations.

14. The computing system of claim 12 wherein the client devices are configured to initiate the connections to the virtual delivery appliance by directly connecting to the virtual delivery appliance using the connection descriptor files.

15. The computing system of claim 12 wherein the client devices are configured to initiate the connections to the virtual delivery appliance via a gateway appliance using the connection descriptor files.

16. The computing system of claim 12 wherein the client devices are further configured to request connection lease resolution data from the connector appliance.

17. The computing system of claim 12 wherein the connector appliance comprises a plurality of connector appliances located in different zones; and wherein the client devices are configured to monitor an availability of the connector appliances in the different zones, and request connections with the connection leases and receive the session validations directly or via a gateway appliance responsive to the availability of at least one of the connector appliances being above or below an availability threshold.

18. The computing system of claim 17 wherein the virtual delivery appliance comprises a plurality of virtual delivery appliances located in different zones; wherein the session validations comprise zone association information; and wherein the client devices are configured to generate connection descriptor files and session requests for direct launch or launch via the gateway appliance responsive to the availability of the connector appliances in different zones and the zone association information.

19. The computing system of claim 12 wherein the leader connector appliance for a zone is configured to:
synchronize with the computing device a local host cache comprising at least one of published resource entitlements and virtual session information; and
without availability of the computing device to authorize connection requests for the zone, validate connection leases, resolve the connection leases to the virtual delivery appliance, and return session validations to the client devices.

20. A connector appliance comprising:
a memory and a processor configured to cooperate with the memory to
receive connection requests from a plurality of client devices to initiate virtual sessions, the connection requests including connection leases issued based upon published resource entitlements, the published resource entitlements for the plurality of client devices being stored and updated by a computing device;
request validation of the connection leases from the computing device,
responsive to validation of the connection leases by the computing device, resolve the connection leases to a virtual delivery appliance that is not connection lease compatible, the virtual delivery appliance instead being configured to provide the client devices with access to the virtual sessions based upon connection descriptor files, and
return a session validation to the client devices for use in preparing the connection descriptor files to access the virtual sessions;
wherein the virtual delivery appliance comprises a plurality of virtual delivery appliances located in different zones; and wherein the connector appliance comprises a plurality of connector appliances located in the different zones and assigned to virtual delivery appliances in their zones; and further comprising, at the connector appliances, re-directing connection requests to another connector appliance in a different zone without availability of the computing device to authorize connection requests for their own zones.

21. The connector appliance of claim 20 wherein the client devices are further configured to request connection lease resolution data from the connector appliance.

22. The connector appliance of claim 20 wherein the connector appliance is configured to direct the client devices to proceed to a next option in their connection leases without availability of the computing device.

* * * * *